United States Patent
Ausserlechner

(10) Patent No.: US 9,915,552 B2
(45) Date of Patent: Mar. 13, 2018

(54) PERPENDICULAR GRADIOMETRIC ANGLE SENSORS, SYSTEMS AND METHODS

(71) Applicant: INFINEON TECHNOLOGIES AG, Neubiberg (DE)

(72) Inventor: Udo Ausserlechner, Villach (AT)

(73) Assignee: Infineon Technologies AG, Neubiberg (DE)

( * ) Notice: Subject to any disclaimer, the term of this patent is extended or adjusted under 35 U.S.C. 154(b) by 1122 days.

(21) Appl. No.: 14/083,647

(22) Filed: Nov. 19, 2013

(65) Prior Publication Data

US 2015/0142376 A1     May 21, 2015

(51) Int. Cl.
*G01D 5/14*     (2006.01)

(52) U.S. Cl.
CPC ................... *G01D 5/145* (2013.01)

(58) Field of Classification Search
CPC .......................................... G01D 5/145
USPC ....................................... 702/151
See application file for complete search history.

(56) References Cited

U.S. PATENT DOCUMENTS

| | | | |
|---|---|---|---|
| 5,686,836 A | 11/1997 | Sasada et al. | |
| 5,880,586 A * | 3/1999 | Dukart | G01R 33/077 324/207.2 |
| 6,064,197 A * | 5/2000 | Lochmann | G01D 5/145 324/207.14 |
| 2004/0130316 A1 * | 7/2004 | Grueger | G01D 5/145 324/207.2 |
| 2011/0068780 A1 * | 3/2011 | Sakai | G01D 5/145 324/207.25 |
| 2012/0223699 A1 | 9/2012 | Holman, Jr. et al. | |

(Continued)

FOREIGN PATENT DOCUMENTS

| | | |
|---|---|---|
| CN | 101836085 A | 9/2010 |
| CN | 101932912 A | 12/2010 |
| CN | 102607405 A | 7/2012 |

OTHER PUBLICATIONS

W. Chao, et al, "Research on magnetoresistive angle sensor without blind angle", Electronic Measurement Technology, May 2007.

(Continued)

*Primary Examiner* — Ricky Ngon
(74) *Attorney, Agent, or Firm* — Schiff Hardin LLP

(57) ABSTRACT

Embodiments relate to magnetic field sensors, such as gradiometric magnetic field angle sensors with generally on-axis arrangements of sensor elements relative to a rotation axis of a magnet. In one embodiment, an angle sensor is arranged on-axis with respect to the rotation axis of a magnet that generates a magnetic field that can be detected by the angle sensor and analyzed to determine an angular position of the magnet. The sensor can comprise a plurality of sensor elements, such as two sensor elements, arranged on a substrate or die in a sensor package. As it rotates, the magnet generates a magnetic field, such as an inhomogenous magnetic field having a component perpendicular to the rotation axis and acting on the angle sensor. The plurality of sensor elements can detect this and other components, for example as a gradiometric sensor in which each element senses at least one component at its respective location, and the signals from the elements are compared to estimate or determine an angular position or degree of movement of the magnet.

20 Claims, 21 Drawing Sheets

(56) References Cited

U.S. PATENT DOCUMENTS

2013/0264915 A1* 10/2013 Suzuki ............... B62D 5/0484
310/68 B
2013/0265037 A1* 10/2013 Friedrich ............. G01R 33/07
324/207.2

OTHER PUBLICATIONS

L. Hao, et al.,"Stimulation research on the angle measurement accuracy of the Hall Sensor in a dexterous hand", Journal of Instrument & Instrumentation, Oct. 2010.

* cited by examiner

PERPENDICULAR GRADIOMETRIC ANGLE SENSORS, SYSTEMS AND METHODS

TECHNICAL FIELD

The invention relates generally to magnetic field sensors, and more particularly to gradiometric magnetic field angle sensors that sample at least two gradients of magnetic field components on the rotation axis, with the magnetic field components being generally perpendicular to the rotation axis.

BACKGROUND

Magnetic field sensors can be used to sense an angle of rotation of a shaft or other object. For example, a magnet can be mounted on the shaft, and a magnetic field sensor can be arranged proximate the magnet in order to sense a magnetic field induced by the magnet as it rotates with the shaft. When the magnetic field sensor is mounted next to or adjacent the shaft, i.e., off of the axis of rotation of the shaft, the sensor is often referred to as an "off-axis" magnetic field angle sensor. Off-axis magnetic field angle sensors often are implemented when the end of the shaft is unavailable as a location for the sensor or there simply is not space available on the shaft. Generally, an "on-axis" magnetic field sensor, then, is one in which the sensor is mounted at or near the end of the shaft, generally in-line with or on the axis of rotation. In some embodiments, on-axis magnetic field angle sensors can comprise gradiometers, such that an on-axis magnetic field gradient sensor measures a gradient of the magnetic field on the rotation axis. The gradient can be measured in sufficient approximation in some applications by sampling the magnetic field at samplings points close to and on opposing sides of the axis and combining the samples, such as by subtraction.

In many applications there is a general preference for magnetic field angle sensors, whether off- or on-axis, to be inexpensive while also being robust with respect to external magnetic fields and other disturbances. A drawback of some conventional approaches, then, is a requirement of at least two sensor substrates with sensor elements having the same magnetic sensitivity and being highly linear. While some approaches address the linearity requirement by using Hall-effect sensor elements, there could be opportunities for other, non-Hall approaches if the linearity requirement were reduced or eliminated. Many conventional approaches use stronger and therefore more expensive magnets, which is another drawback when cost is a concern. Additionally, the accuracy of many conventional magnetic field angle sensors can be reduced if assembly tolerances are not closely controlled. Yet another drawback of many conventional on-axis magnetic field angle sensors is errors caused by background magnetic fields. In general, therefore, there are numerous drawbacks associated with conventional magnetic field angle sensors.

SUMMARY

Embodiments relate to magnetic field sensors, such as gradiometric magnetic field angle sensors with generally on-axis arrangements of sensor elements relative to a rotation axis of a magnet.

In an embodiment, a magnetic field angle sensor configured to determine a rotational position of a magnetic field source with respect to a rotation axis, comprises a die comprising a first surface and arranged in-line with the rotation axis such that a projection of the rotation axis extends through the die substantially perpendicularly to the first surface; at least three magnetic field sensor elements arranged on the first surface of the die around the projection of the rotation axis, the at least three magnetic field sensor elements configured to sense at least two gradients of a magnetic field induced by the magnetic field source, the at least three magnetic field sensor elements being sensitive to magnetic field components substantially perpendicular to the rotation axis and parallel with the first surface; and circuitry configured to determine the rotational position of the magnetic field source by determining at least one linear combination of the at least two gradients and deriving the rotational position from the at least one linear combination.

In an embodiment, a method of determining a rotational position of a magnetic field source with respect to a rotation axis, comprises providing at least three magnetic field sensor elements arranged on a surface around a projection of the rotation axis onto the surface, the at least three magnetic field sensor elements configured to sense at least two gradients of a magnetic field component of a magnetic field induced by the magnetic field source, the magnetic field component being substantially perpendicular to the rotation axis and parallel with the surface; and providing circuitry coupled to the at least three magnetic field sensor elements to operably determine the rotational position of the magnetic field source by determining at least one linear combination of the at least two gradients and deriving the rotational position from the at least one linear combination.

BRIEF DESCRIPTION OF THE DRAWINGS

The invention may be more completely understood in consideration of the following detailed description of various embodiments of the invention in connection with the accompanying drawings, in which.

Figure 1A:
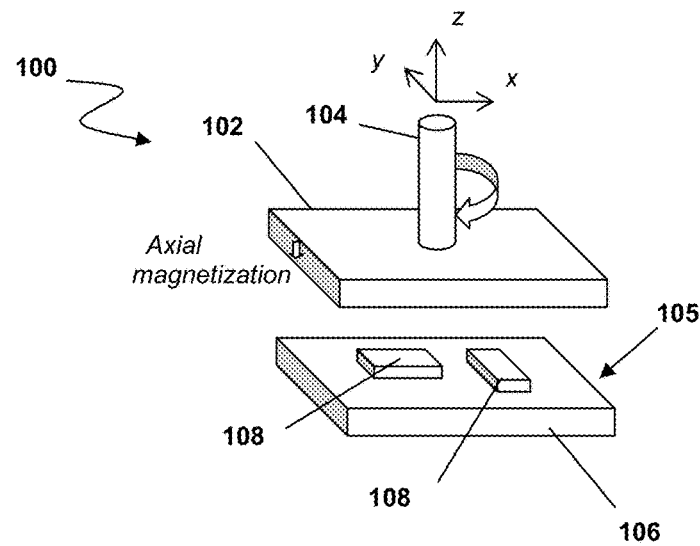
FIG. 1A is a perspective view of an on-axis sensor system according to an embodiment.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Embodiments relate to magnetic field sensors, such as gradiometric magnetic field angle sensors with generally on-axis arrangements of sensor elements relative to a rotation axis of a magnet. In one embodiment, an angle sensor is arranged on-axis with respect to the rotation axis of a magnet that generates a magnetic field that can be detected by the angle sensor and analyzed to determine an angular position of the magnet. The sensor can comprise a plurality of sensor elements, such as two sensor elements, arranged on a substrate or die in a sensor package. As it rotates, the magnet generates a magnetic field, such as an inhomogenous magnetic field having a component perpendicular to the rotation axis and acting on the angle sensor. The plurality of sensor elements can detect this and other components, for example as a gradiometric sensor in which each element senses at least one component at its respective location, and the signals from the elements are compared to estimate or determine an angular position or degree of movement of the magnet. Embodiments thereby provide numerous advantages, including robustness against homogeneous magnetic disturbance fields given the gradiometric configuration.

Referring to FIG. 1A, an example of an on-axis angle sensor system 100 is depicted. Sensor system 100 comprises a magnet 102 mounted or otherwise affixed to a shaft 104 such that magnet 102 rotates with shaft 104. Magnet 102 can comprise a permanent magnet in one embodiment or another magnetic field source in other embodiments, such as an electromagnet, simple coils (e.g., of wires or other conductors) that generate a magnetic field when current flows through them. In still other embodiments, the magnetic field source (e.g., magnet 102) can be decoupled from shaft 104, or otherwise arranged in a fixed position along with a sensor 105, and another magnetic component, such as an iron portion, rotates and causes changes in the magnetic field which can be sensed by sensor 105.

Still referring to FIG. 1A, sensor 105 comprises a substrate or die 106 and is arranged proximate magnet 102 and shaft 104. In system 100, sensor 105 is arranged generally coaxially with shaft 104, with die 106 oriented perpendicularly thereto. Though referred to herein generally as a die, die 106 can comprise a substrate, die, circuit board or other structure, comprising a semiconductor material, ceramic, glass, epoxy (e.g., a glass fiber-reinforced epoxy such as FR4) or other suitable material, with or without a package, in various embodiments, and use of the term die herein is not to be considered limiting to any particular embodiment or with respect to the claims.

A major plane of die 106, i.e., the xy-planar surface facing upwardly in the orientation of FIG. 1A and on which magnetic field sensor elements 108 are mounted, is arranged perpendicularly to the rotation axis of shaft 104 as illustrated. In other embodiments, die 106 can be inverted or flipped such that the same xy-surface faces downwardly, or arranged in some other suitable manner. In one embodiment, two magnetic field sensor elements 108 are arranged on die 106, though in other embodiments discussed herein more or fewer sensor elements 108 generally can be used. The relative positions of die 106, magnet 102 and/or shaft 104 can vary in embodiments, as can the relative arrangement and orientations of sensor elements 108, with FIG. 1A being exemplary of but one embodiment. For example, in other embodiments a plurality of sensors 105 having more or fewer sensor elements 108 can be used, and or sensor 105 can be arranged generally above rather than below shaft 104 and magnet 102, or in some other configuration. Moreover, FIG. 1A is not to scale and is a simplified conceptual depiction to illustrate basic components and features of an embodiment of system 100.

Magnet 102 is axially magnetized in embodiments, e.g., in the −z-direction in the embodiment of FIG. 1A. In other embodiments, magnet 102 can be diametrically or otherwise magnetized. Sensor elements 108 are sensitive to magnetic field components which are in or parallel to the (x,y)-planar surface of die 106 and, in embodiments, can comprise magneto-resistive (MR) sensor elements (e.g., AMR, GMR, TMR, CMR and others), giant magneto-impedance (GMI) sensor elements, Hall-effect sensor elements (e.g., vertical Hall, Hall plates, and others), MAGFETs and other magnetic field sensor elements and combinations thereof.

The shape and configuration of magnet 102 can vary in embodiments, with the configuration of FIG. 1A being used merely to illustrate a general relative arrangement of elements and not being limiting with respect to other embodiments or configurations. Though magnet 102 is depicted as being centered on shaft 104 in FIG. 1A, other embodiments discussed herein describe other arrangements, such as those in which magnet 102 is not centered on the rotation axis running through shaft 104 (see, e.g., FIG. 2) and/or comprises a different shape. In one embodiment, such as that of FIG. 2 below, magnet 102 is generally cylindrical, with a symmetry axis not aligned or coinciding with but parallel to the rotation axis, which is the same as the z-axis here (and, e.g., spaced apart by a distance $\epsilon_R$) and having a circular cross-section in the (x,y)-plane, with respect to the orientation and reference frame of FIG. 2, which can vary in other embodiments. In embodiments, the magnet is axially magnetized, as illustrated, though other magnetization directions and types can be implemented in other embodiments.

With this symmetry and configuration, the projection of a magnetic field induced by axially magnetized magnet 102 in any plane "z=constant" has only a radial component and no azimuthal component in a cylindrical reference frame that is centered with the symmetry of the magnet. Moreover, this field can have a constant magnitude along concentric circles. Thus, if the radial distance of the test point from the center of magnet 102 is R, the projection of the field can be described by $B_R = f(R)$, where f(R) is some arbitrary function versus radial distance, which fades out over large distances. Consequently, the x- and y-components of this field are $B_x = xf(R)/R$ and $B_y = yf(R)/R$. If the center of magnet 102 is shifted to the position $(x,y) = (\epsilon_R \cos \phi, \epsilon_R \sin \phi)$ in a reference frame centered on the rotation axis, with $\epsilon_R$ being the eccentricity and $\phi$ the rotational position of the symmetry axis of magnet 102, the magnetic field in this reference frame becomes:

$$B_x = (x - \epsilon_R \cos \phi) f(\sqrt{(x-\epsilon_R\cos\phi)^2 + (y-\epsilon_R\sin\phi)^2}) / \sqrt{(x-\epsilon_R\cos\phi)^2 + (y-\epsilon_R\sin\phi)^2}$$

and $$B_y = (y - \epsilon_R \sin \phi) f(\sqrt{(x-\epsilon_R\cos\phi)^2 + (y-\epsilon_R\sin\phi)^2}) / \sqrt{(x-\epsilon_R\cos\phi)^2 + (y-\epsilon_R\sin\phi)^2}$$

If a gradiometric sensor (e.g, sensor 105) is positioned at (x,y)=(0,0), it can detect the following four gradients on the rotation axis:

$$\frac{\partial B_x}{\partial x} = \frac{f(\epsilon_R)}{\epsilon_R} \sin^2\varphi + f'(\epsilon_R)\cos^2\varphi$$

$$\frac{\partial B_y}{\partial y} = \frac{f(\epsilon_R)}{\epsilon_R} \cos^2\varphi + f'(\epsilon_R)\sin^2\varphi$$

$$\frac{\partial B_y}{\partial x} = \frac{\partial B_x}{\partial y} = \left(f'(\epsilon_R) - \frac{f(\epsilon_R)}{\epsilon_R}\right)\cos\varphi\sin\varphi$$

whereby f'(R) is the derivative of f(R) against the eccentric radial position $\epsilon_R$. Rearranging this gives two sinusoidal signals which have the same amplitude and a 90° phase shift:

$$\frac{\partial B_y}{\partial x} + \frac{\partial B_x}{\partial y} = \left(f'(\epsilon_R) - \frac{f(\epsilon_R)}{\epsilon_R}\right)\sin 2\varphi$$

$$\frac{\partial B_x}{\partial x} - \frac{\partial B_y}{\partial y} = \left(f'(\epsilon_R) - \frac{f(\epsilon_R)}{\epsilon_R}\right)\cos 2\varphi$$

The rotation angle $\phi$ of magnet 102 then can be derived from these two sinusoidal signals, e.g., by using the arctangent function of a ratio of the signals and dividing by two. Alternatively, system can determine the pointer $$\frac{\partial B_x}{\partial x} - \frac{\partial B_y}{\partial y} + j\left(\frac{\partial B_y}{\partial x} + \frac{\partial B_x}{\partial y}\right) = \left(f'(\epsilon_R) - \frac{f(\epsilon_R)}{\epsilon_R}\right)\exp(2j\varphi)$$

in the complex plane, using the imaginary unit $j=\sqrt{-1}$. This is the same as the expression $$\left(\frac{\partial}{\partial x} + j\frac{\partial}{\partial y}\right)(B_x + jB_y)$$

which can be interpreted as a complex-valued gradient $$\left(\frac{\partial}{\partial x} + j\frac{\partial}{\partial y}\right)$$

that operates on a complex-valued magnetic field $(B_x+jB_y)$. Thereby a complex-valued gradient is equivalent to two real-valued gradients, which are the real and imaginary parts of the complex-valued gradient. The rotational position of the magnet is half of the angle of this pointer with the positive real axis in the complex plane. In embodiments, sensor 105 may only work for a half-revolution (e.g., over 180°). In one embodiment, a magnet 102 for which $f'(\epsilon_R) - f(\epsilon_R)/\epsilon_R \neq 0$ can be advantageous, such as one for which the magnitude of this term is maximized to provide a strong, robust signal.

Figure 1B:
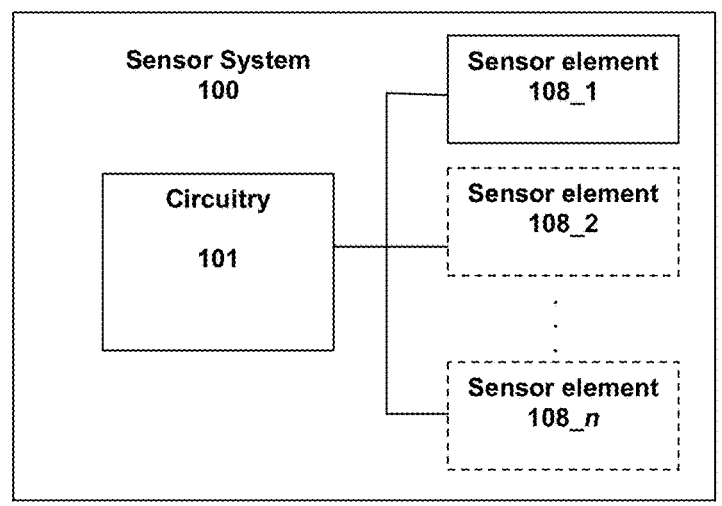
FIG. 1B is a block diagram of a portion of the sensor system of FIG. 1A.

In embodiments, the calculations, determinations and computations discussed herein can be carried out by control or other circuitry forming part of or otherwise coupled to sensor elements 108 (e.g., 108_1, 108_2, 108_n). One embodiment is depicted in FIG. 1B, in which circuitry 101 is part of system 100 and is coupled to sensors 108, though in embodiments more or fewer sensors may be implemented in system 100. Circuitry 101 can comprise control, evaluation, signal conditioning and/or other circuitry and be dedicated sensor system circuitry, or it can comprise part of another system or component (e.g., an electronic control unit, ECU, in automotive or other applications). System 100 can be arranged on a single die or board in a single package, or in or on multiple dies and/or packages, and the various components (not all of which are depicted in the simplified block diagram of FIG. 1B) can be electrically, communicatively and/or operatively coupled with another as suitable or appropriate for any given application or implementation, as those skilled in the art will appreciate that these arrangements will vary.

Figure 2:
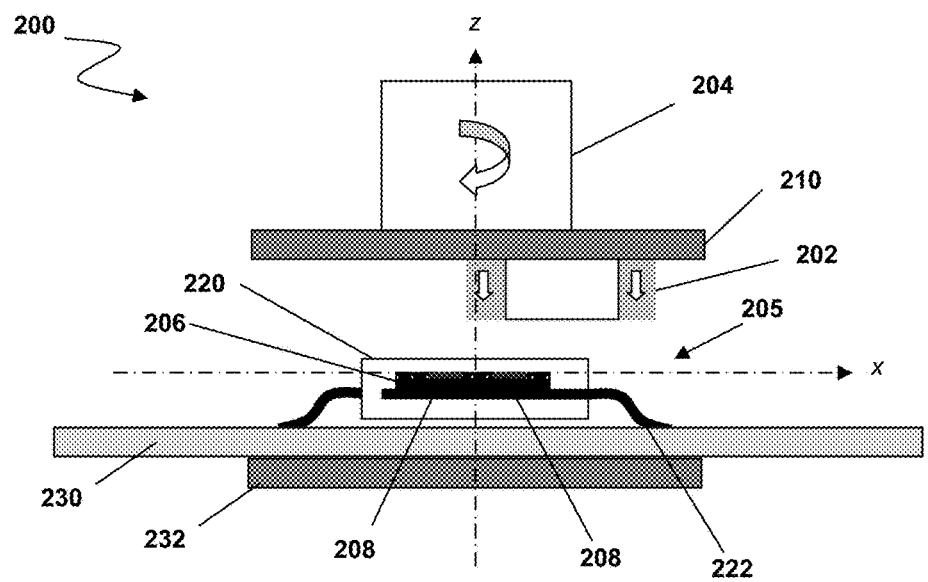
FIG. 2 is a side cross-sectional view of a sensor system according to an embodiment.

Referring to FIG. 2, an example embodiment of a sensor system 200 is depicted. Herein throughout, similar reference numerals (e.g., magnet 102 and magnet 202) will be used to refer to similar elements, though those elements need not be identical unless otherwise described as such. System 200 comprises a magnet 202 coupled to and rotatable with a shaft 204. In FIG. 2, magnet 202 is coupled to shaft 204 by an optional backplane 210, which can comprise iron or another ferrous or non-ferrous material in embodiments, that rotates with shaft 204. Magnet 202 can be eccentrically coupled to backplane 210 with respect to the z-axis (i.e., the rotation axis) and center of shaft 204 and backplane 210, as depicted in FIG. 2, or mounted in some other location or manner. Magnet 202 comprises an axially magnetized ring magnet in embodiments. In FIG. 2, magnet 202 is axially magnetized in the −z-direction, though it can be magnetized in a +z-direction, or magnetized in a way other than axially, in other embodiments.

Arranged proximate magnet 202 and on-axis with respect to the rotation axis is a sensor 205. Sensor 205 comprises a sensor package 220 in which at least two sensor elements 208 are arranged on a die 206. Package 220 is coupled to a printed circuit board (PCB) 230 or other structure by a leadframe 222. An optional backplane 232 is coupled to PCB 230 and, like backplane 210, can comprise iron or another ferrous or non-ferrous material in embodiments.

Figure 3:
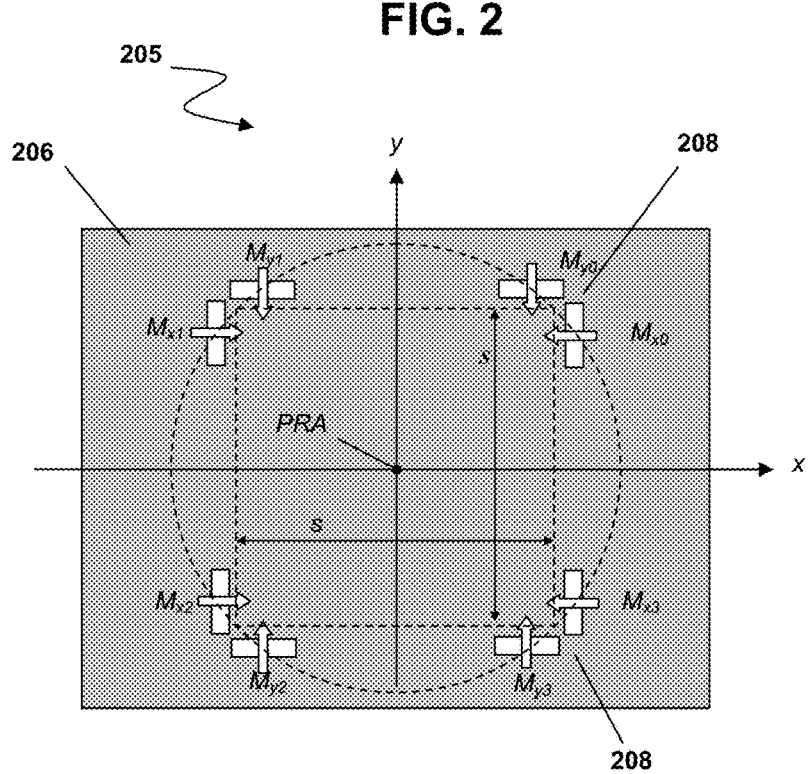
FIG. 3 is a plan view of a sensor die according to an embodiment.

A more detailed plan view of one embodiment of sensor 205 is depicted in FIG. 3. In this embodiment, sensor 205 comprises at least one gradiometer in two different directions: the x-direction and the y-direction. For example, as depicted, sensor 205 comprises eight sensor elements 208 (Mx0, My0, Mx1, My1, Mx2, My2, Mx3, My3) arranged on die 206 relative to a projection of the rotation axis (PRA) thereon. PRA is depicted at the geometrical center of die 206 in the embodiment of FIG. 3 but can be otherwise positioned relative to die 206 in other embodiments. PRA is also depicted as the center of a circle on which sensor elements Mx0, My0, Mx1, My1, Mx2, My2, Mx3, My3 are arranged, such that sensor elements Mx0, My0, Mx1, My1, Mx2, My2, Mx3, My3 are generally equidistantly spaced from PRA in an embodiment.

Sensor elements Mx0, My0, Mx1, My1, Mx2, My2, Mx3, My3 can comprise Hall-effect sensor elements (e.g., ordinary Hall devices or vertical Hall devices), magnetoresistive (XMR) sensor elements (e.g., AMR, GMR, TMR, CMR, etc.) or some other suitable magnetic field sensing elements in embodiments. In embodiments, sensor elements Mx0, My0, Mx1, My1, Mx2, My2, Mx3, My3 comprise vertical Hall devices or XMR elements, which generally are responsive to in-plane projections of the magnetic field. In other embodiments, other magnetic field sensing elements, suitably arranged and positioned so as to be responsive to a desired magnetic field component, can be used.

Sensor elements Mx0, My0, Mx1, My1, Mx2, My2, Mx3, My3 are arranged in pairs (e.g., Mx0 and My0), wherein one sensor element Mx0 of each pair is responsive to Bx (i.e., the x component of magnetic field B) and the other sensor element of the pair is responsive to By (i.e., the y component of magnetic field B. The arrow on each sensor element Mx0, My0, Mx1, My1, Mx2, My2, Mx3, My3 in FIG. 3 indicates the direction of the magnetic field component to which that sensor element is responsive. More precisely, the output signal Mx0 can be assumed to increase if a magnitude of the magnetic field pointing in the direction of the arrow drawn at element Mx0 in FIG. 3 increases (i.e., the output signal of Mx0 is larger for Bx=−10 mT than for Bx=−5 mT). Other layouts and arrangements than the one depicted as an example in FIG. 3 are possible, e.g., by rotating each sensor element by 180°. As arranged in FIG. 3, the following four gradients can be derived:

$$\frac{\partial B_y}{\partial x}, \frac{\partial B_x}{\partial y}, \frac{\partial B_x}{\partial x}, \frac{\partial B_y}{\partial y}$$

In practice, sensors like sensor 205 may only approximate gradients by measuring the field component at two different locations and determining a difference therebetween. Strictly speaking, the gradient is the mathematical limit value for vanishing spacing between the two locations, though in practice the spacing between locations on die 206 can be quite small (e.g., on the order of about 100 micrometers to about 500 micrometers in embodiments, and generally less than about 4 mm) compared with the size of magnet 202 (e.g., on the order of about 10 mm in diameter). Thus, sensor elements Mx0, My0, Mx1, My1, Mx2, My2, Mx3, My3 (or circuitry coupled thereto) as arranged in FIG. 3 can approximate the gradients according to:

$$\frac{\partial B_y}{\partial x} = \frac{M_{y3} - M_{y0} - M_{y2} + M_{y1}}{2s}$$

$$\frac{\partial B_x}{\partial y} = \frac{M_{x1} - M_{x0} - M_{x2} + M_{x3}}{2s}$$

$$\frac{\partial B_y}{\partial y} = \frac{-M_{y0} - M_{y1} - M_{y2} - M_{y3}}{2s}$$

$$\frac{\partial B_x}{\partial x} = \frac{-M_{x0} - M_{x1} - M_{x3} - M_{x2}}{2s}$$

Though the magnetic field is sampled slightly off-axis, given the relative arrangement of sensor elements Mx0, My0, Mx1, My1, Mx2, My2, Mx3, My3 and PRA, sensor 205 can determine the gradients dBx/dx, dBy/dx, dBx/dy and dBy/dx on-axis because the gradient is located on the axis if the field components are sampled symmetrically and slightly off-axis.

Figure 4:
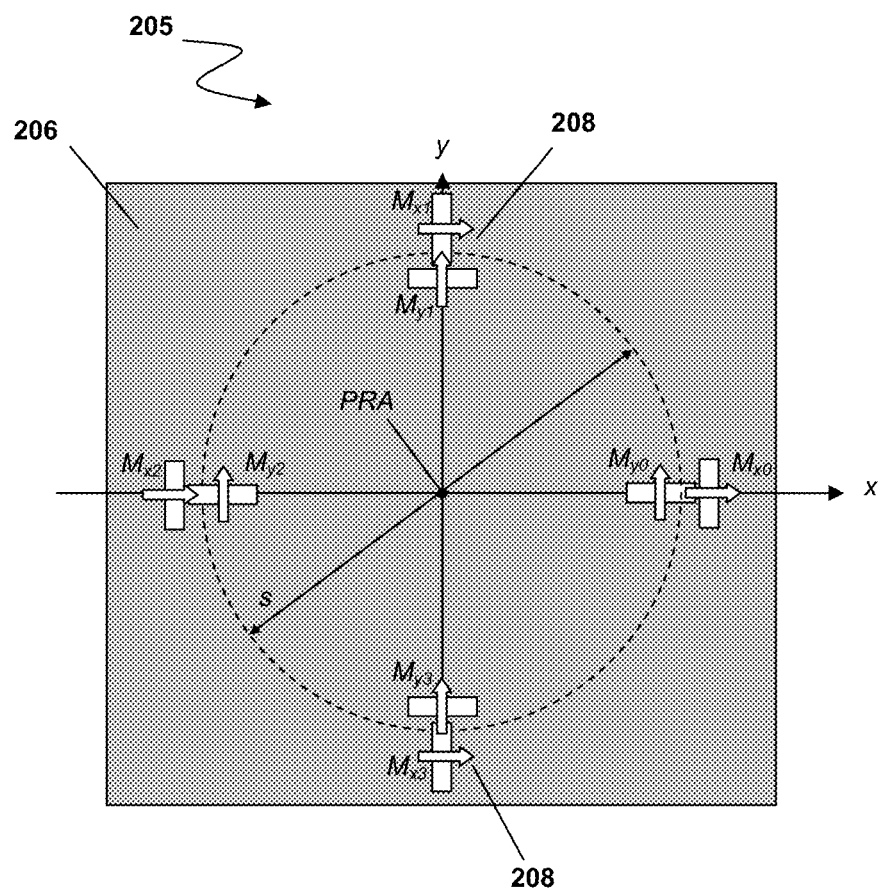
FIG. 4 is a plan view of a sensor die according to an embodiment.

Another example embodiment of sensor 205 is shown in FIG. 4, which also comprises eight sensor elements Mx0, My0, Mx1, My1, Mx2, My2, Mx3, My3 arranged in a different configuration on die 206. In FIG. 4, the gradiometer signals are $$\frac{\partial B_y}{\partial x} = \frac{M_{y0} - M_{y2}}{s}$$

$$\frac{\partial B_x}{\partial y} = \frac{M_{x1} - M_{x3}}{s}$$

$$\frac{\partial B_y}{\partial y} = \frac{M_{y1} - M_{y3}}{s}$$

$$\frac{\partial B_x}{\partial x} = \frac{M_{x0} - M_{x2}}{s}$$

In both FIGS. 3 and 4, it is assumed that the size of sensor elements Mx0, My0, Mx1, My1, Mx2, My2, Mx3, My3 is generally small compared with the spacing s as shown in each drawing. This assumption makes it irrelevant if the Mx sensor element is left, right, above or below the corresponding My sensor element. If, in embodiments, the size of elements Mx0, My0, Mx1, My1, Mx2, My2, Mx3, My3 is not negligible, there are several different ways in which the elements of any particular pair (e.g., sensor elements Mx0 and My0) can be arranged. In one embodiment, both can be placed on the circle illustrated in FIGS. 3 and 4 (the center of which is PRA) at slightly different azimuthal positions, with the My sensor element arranged as close as possible to the Mx sensor element but shifted slightly clockwise (or counter-clockwise) for each pair. In another embodiment, the sensor elements of any pair can be arranged at the same azimuthal position but on different circles, whereby the different circles are each centered at PRA and arranged concentrically having different radii, and all of the x-elements are arranged on one circle with all of the y-elements on a different circle. In yet another embodiment, the sensor elements of each pair can be split into sub-elements arranged on a common centroid arrangement, e.g., like one known for matched transistor pairs, such that within a pair of Mx and My sensor elements the center of gravity of the Mx sensor element is the same as the center of gravity of the My sensor. Other configurations and arrangements can be implemented in other embodiments.

In the aforementioned mathematical limit, both sensor element signals of any pair vary sinusoidally with the rotation angle of magnet 202, have the same amplitudes, and have a 90-degree phase shift (i.e., are in quadrature). Thus, the rotational position of magnet 202 can be derived in numerous ways, such as:

$$\arctan_2\left\{\frac{\partial B_x}{\partial x} - \frac{\partial B_y}{\partial y}, \frac{\partial B_y}{\partial x} + \frac{\partial B_x}{\partial y}\right\}$$

In practice, the sensor elements of each gradiometer are spaced apart by some non-vanishing distance. This can introduce small angle errors with a period of 90 degrees, though these errors can be reduced if system 200 comprises two sub-systems, wherein the first sub-system comprises, e.g., that which is depicted in FIG. 3, and the second sub-system is the same but rotated around PRA with respect thereto by 45 degrees. The entire sub-system can be rotated, or only the positions of the sensor elements while keeping their directions and alignments with respect to an edge of die 206 constant.

According to this equation, which follows from Maxwell's equations, the curl of the magnetic field vanishes:

$$\frac{\partial B_y}{\partial x} = \frac{\partial B_x}{\partial y}$$

Thus, sensor 205 can detect only one of each dBx/dy and dBy/dx and then multiply that result by two. Because the divergence of the magnetic field must also vanish according to Maxwell's equations, it is possible to measure one of each gradient dBx/dx and dBy/dy. If magnet 202 is such that dBz/dz=0 on the surface of die 206, then it follows that $$\frac{\partial B_x}{\partial x} = -\frac{\partial B_y}{\partial y}$$

such that system 200 needs only measure one and multiply it by two. This condition, dBz/dz=0, can be obtained, e.g., inside a bore of magnet 202 near the midplane. Therefore, instead of having to sample all four gradients $$\frac{\partial B_y}{\partial x}, \frac{\partial B_x}{\partial y}, \frac{\partial B_x}{\partial x}, \frac{\partial B_y}{\partial y},$$

it can be sufficient in embodiments to sample only three $$\left(\text{e.g.,} \frac{\partial B_y}{\partial x}, \frac{\partial B_x}{\partial x}, \frac{\partial B_y}{\partial y} \text{ or } \frac{\partial B_x}{\partial y}, \frac{\partial B_x}{\partial x}, \frac{\partial B_y}{\partial y}\right),$$

and for special arrangements that provide dBz/dz=0 on the surface of die 206, the sensor system also can work with merely two gradients, e.g., $$\frac{\partial B_y}{\partial x}, \frac{\partial B_x}{\partial x}, \frac{\partial B_y}{\partial x}, \frac{\partial B_y}{\partial y}, \frac{\partial B_x}{\partial y}, \frac{\partial B_x}{\partial x}$$

or $$\frac{\partial B_x}{\partial y}, \frac{\partial B_y}{\partial y}.$$

Figure 5A:
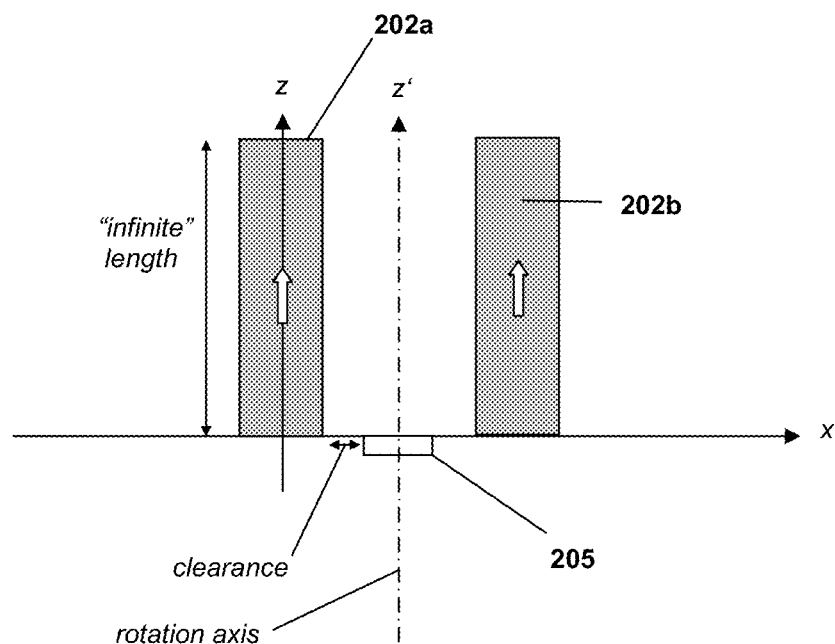
FIG. 5A is a side view of a magnet and sensor according to an embodiment.
Figure 5B:
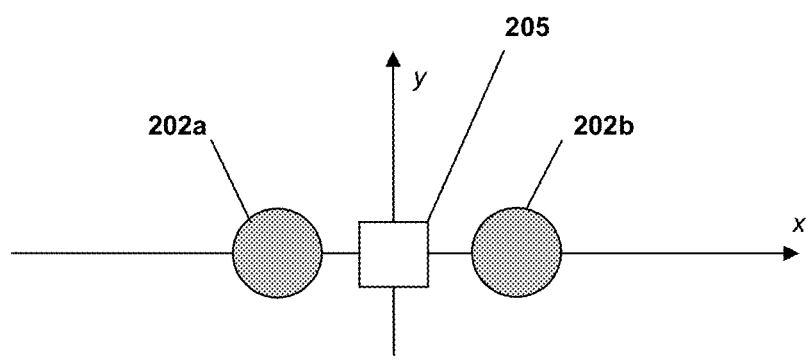
FIG. 5B is a plan view of FIG. 5A.

Referring also to FIGS. 5A and 5B, one example configuration of magnet 202 and sensor 205 is depicted. In this embodiment, magnet 202 comprises two portions 202a and 202b arranged with respect to the rotation axis z' and sensor 205 which is on-axis. In embodiments having a long axial length, such a configuration corresponds with dBz/dz=0 and can maximize the magnetic fields and their gradients. In embodiments, magnets 202a and 202b are of "infinite" length, i.e., of sufficient axial length as compared with lateral dimensions. If magnets 202a and 202b are coupled at their top surfaces (referring to the example orientation shown in FIG. 5A) to a ferrous element, such as a backplane as in FIG. 2, axial lengths equal to a maximum radial distance is sufficient to be "infinite," though without the ferrous element the length of magnets 202a and 202b should be at least about double a lateral dimension (e.g., diameter in the embodiment of FIGS. 5A and 5B).

In a sensor system comprising magnets 202a and 202b in a configuration like the one depicted in FIGS. 5A and 5B, the magnetic field induced by magnets 202a and 202b originates from a hypothetical magnetic charge on the pole faces of magnets 202a and 202b. Thus, the magnetic fields and their gradients are maximized when the charges of one polarity (e.g., at the bottom surfaces of magnets 202a and 202b) are as close as possible to the sensors elements of sensor 205. This can mean they are arranged in the same plane in embodiments. The charges of opposite polarity (e.g., at the top surfaces of magnets 202a and 202b) weaken the field, hence the "infinite" length of magnets 202a and 202b such that the tops surfaces are as far away as possible or practical.

Figure 6A:
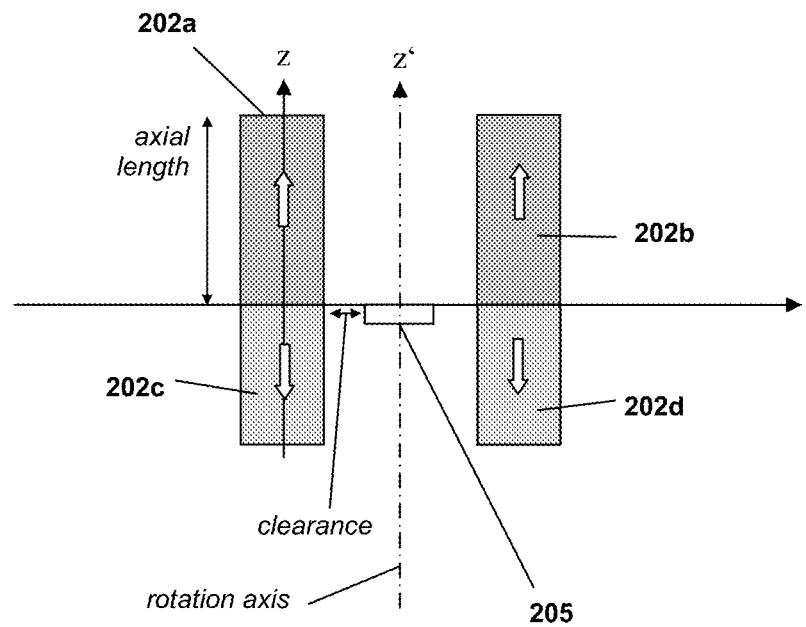
FIG. 6A is a side view of a magnet and sensor according to an embodiment.
Figure 6B:
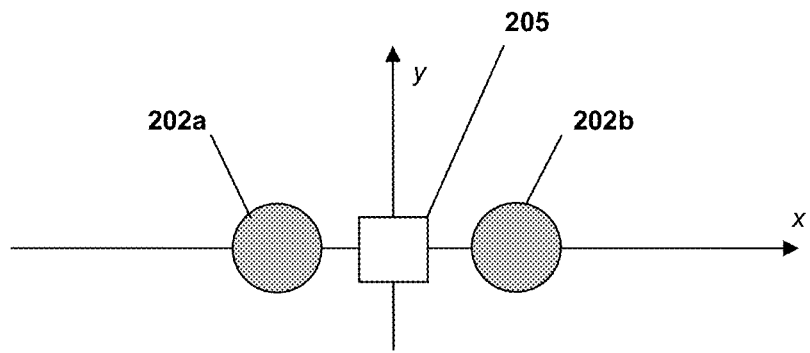
FIG. 6B is a plan view of FIG. 6A.

Referring also to FIGS. 6A and 6B, these fields can be increased by adding two additional magnets 202c and 202d with opposing directions of magnetization as shown. In embodiments, the upper (202a, 202b) and lower (202c, 202d) magnets are arranged in parallel with the rotation axis, though this need not be the case in every embodiment. When arranged in parallel as depicted in FIGS. 6A and 6B, however, the magnetic charge in the plane of sensor 205 increase. The rotation axis, again, is z'.

Additional shapes and configurations of magnet 202 can be implemented in other embodiments. Advantageous designs can be derived, in embodiments, using the principle of linear supposition or in some other way. For example, if magnet 202 is eccentrically mounted with respect to the rotation axis (e.g., as depicted in FIG. 2, where x>0), an identical second magnet can be added and mounted in a diametrically opposing position such that the total magnet assembly has a symmetry plane of x=0. In other words, the total magnet assembly has an even symmetry with respect to x=0, such that any magnetized volume at position (x,y,z) has an identical counterpart at position (−x,y,z). This leads to an odd symmetry of the Bx-field, or Bx(x,y,z)=−Bx(−x,y,z). An axially magnetized magnet with a rotational shape and centered at the rotation axis does not produce any signal.

Thus, such a magnet can be added to or subtracted from another useful magnet in embodiments to obtain another, different useful magnet. In embodiments, however, and even if an axially magnetized magnet does not have a perfect rotation shape, it still may not produce a useful or measurable signal. This can be the case, e.g., if any geometrical features of the magnet that are not in rotational symmetry are positioned far enough away from the rotation axis. For example, if the magnet is square-shaped and very large, its outer perimeter produces a small signal versus the rotation angle, which is negligible (e.g., if the magnet is about 30 mm by about 30 mm by about 5 mm and sensor 205 is only about 2 mm off the surface—i.e., the 30 mm by 30 mm main surface—then sensor 205 sees, in lateral directions, an infinitely large surface of hypothetical magnetic charges, and the deviations from rotational symmetry are so far away as to not provide any notable contributions).

In some embodiments, such as the one of FIG. 2 in which magnet 202 comprises a ring-shaped magnet, the magnet can comprise a bore or hole. A hole in the magnet can be the same as a superposition of the magnet without a hole and a magnet identical to the hole with a magnetization of equal magnitude and opposite axial direction. In still other embodiments, a bore or hole in the magnet can be filled with a magnet or magnetic material having an opposite axial direction of magnetization.

Figure 7:
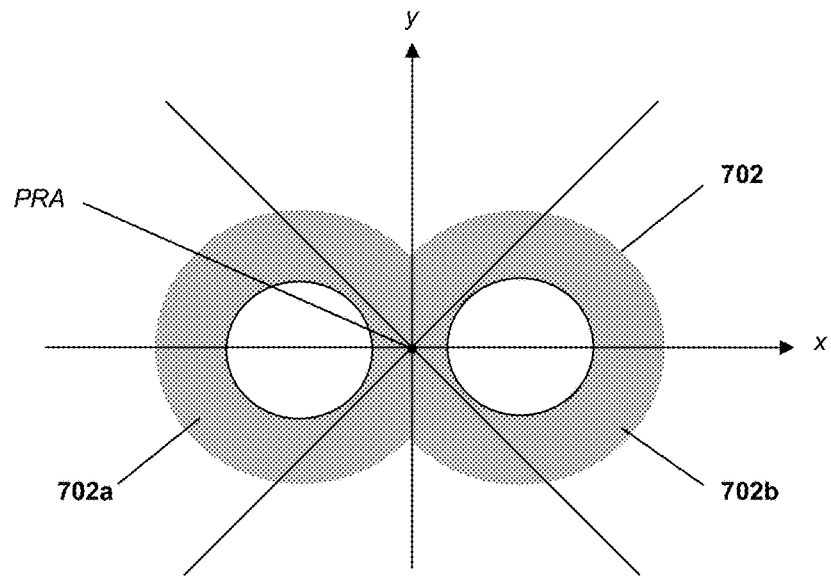
FIG. 7 is a plan view of a magnet according to an embodiment.

An example magnet 702 is depicted in FIG. 7 and comprises two coupled rings 702a and 702b diametrically opposed and eccentrically mounted with respect to PRA. While rings 702a and 702b are depicted as being essentially identical in size, shape and configuration, they need not be in other embodiments. For example, rings 702a and 70b (or whatever other shape one or more portions of magnet 702 may comprise in other embodiments) can be of different size or thickness, among other possible characteristics. It can be advantageous, however, for rings 702a and 702b to be identical or nearly so, because it can be advantageous for only a gradient, and not an absolute field, to be present at the sensor location. Thus, to measure dBx/dx, Bx should be equal to 0. The reason is mismatch of sensor elements in sensor 205. dBx/dx is measured by the signal $$(S1*Bx1-S2*Bx2)/dx$$

with Bx1=Bx at x=dx/2 and Bx2=Bx at x=−dx/2 and S1, S2 being the magnetic sensitivities of the sensor elements of sensor 205 at locations −/+dx/2. Bx1=B0+dBx/2 and Bx2=B0−dBx/2 can be decomposed with B0=(Bx1+Bx2)/2 and dBx=Bx1−Bx2 and S1=S0*(1+MM/2) and S2=S0*(1−MM/2) with MM being the mismatch between the sensitivities. Then the signal for dBx/dx becomes S0*(dBx+MM*B0). Thus, the signal includes the desired part S0*dBx, but it also contains an error term S0*MM*B0. The error term is proportional to the unavoidable mismatch between the sensor elements and to the average field on both sensors elements. It is desired that this average field vanish in order to minimize the mismatch term. One way to accomplish this is through symmetry of magnet 702: if the magnet is mirror symmetric to the x=0 plane, the Bx-field has odd symmetry versus x and consequently B0=0. This can be a primary reason, then, for magnet 702 to be configured as depicted, or similarly, with two equal opposite holes, than to have only a single hole or two different holes. Alternatively, if the holes are different, the symmetry location B0=0 will shift out of the center between both, such that this B0=0 location could be used as the rotation axis.

Figure 8:
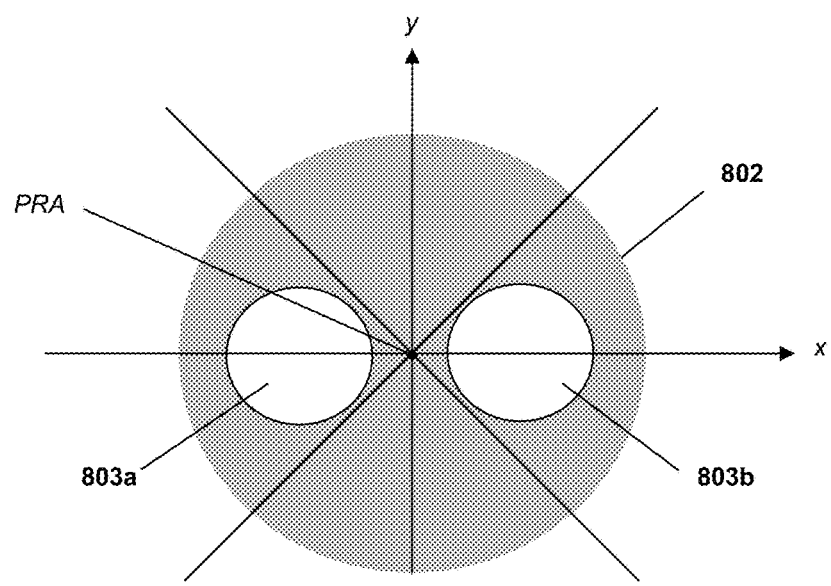
FIG. 8 is a plan view of a magnet according to an embodiment.

Instead of using two hollow cylinders, one may also use a large cylinder 802 comprising two holes 803a and 803b, such as is depicted in FIG. 8. Cylinder 802, omitting holes 803a and 803b, is rotationally symmetric around the rotation axis so that it does not produce a gradient signal. Holes 803a and 803b disturb this symmetry in the same way as the two hollow cylinders of FIG. 7. Instead of two holes 803a and 803b, the holes can be filled with oppositely magnetized magnets or materials, as previously mentioned. In practice this can be easier to manufacture and have greater mechanical stability, because in such an embodiment the entire magnet 802 can comprise a single large cylinder with homogeneous magnetization in the +z direction, and in a later processing step the magnetization is reversed to the −z direction within the two holes 803a and 803b.

Figure 9:
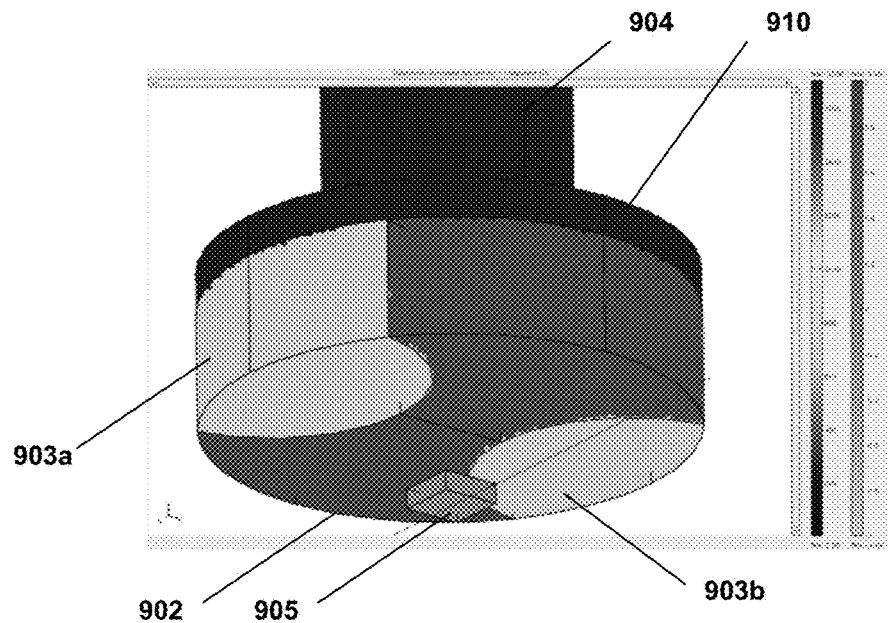
FIG. 9 is a perspective view of a magnet and sensor according to an embodiment.
Figure 10A:
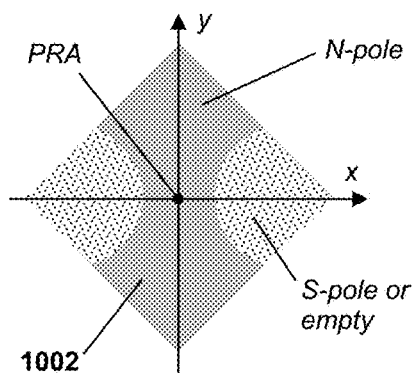
FIG. 10A is a plan view of a magnet according to an embodiment.
Figure 10B:
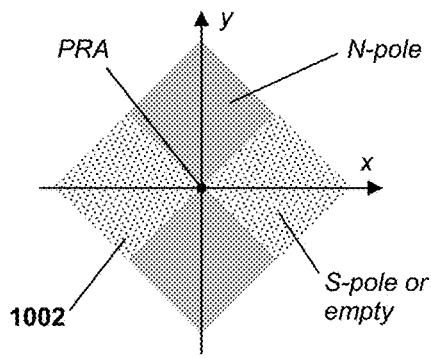
FIG. 10B is a plan view of a magnet according to an embodiment.
Figure 10C:
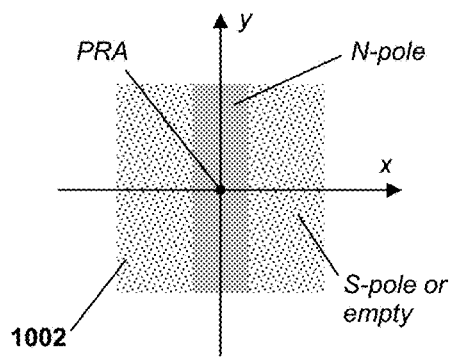
FIG. 10C is a plan view of a magnet according to an embodiment.
Figure 10D:
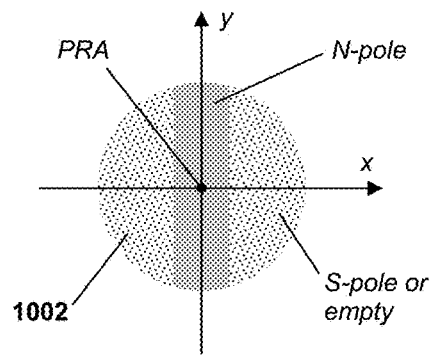
FIG. 10D is a plan view of a magnet according to an embodiment.
Figure 10E:
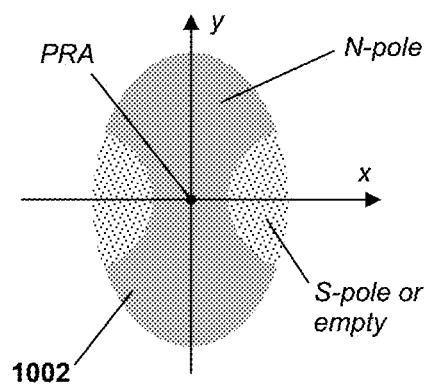
FIG. 10E is a plan view of a magnet according to an embodiment.
Figure 10F:
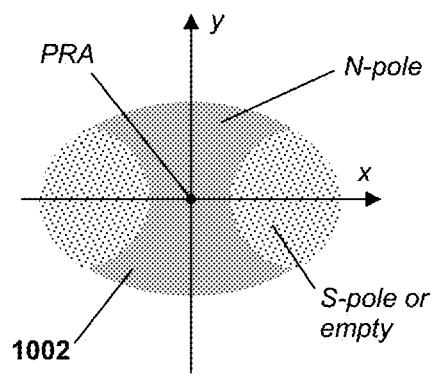
FIG. 10F is a plan view of a magnet according to an embodiment.

Referring also to FIG. 9, the positions of the holes can be altered, e.g., so that the holes intersect a perimeter of the magnet cylinder, such as is the case for portions 903a and 903b in magnet 902. Magnet 902 is mounted to a plate 910 that is coupled to or forms part of shaft 904. Both shaft 904 and plate 902 can comprise a ferrous material in embodiments, such as a soft steel having a relative magnetic permeability of $\mu_r$=1,700. In one example, shaft 902 has a diameter of about 6 mm, and plate 910 is about 12 mm in diameter and 1 mm thick. Magnet 902 is about 12 mm in diameter and 3 mm thick and comprises portions 903a and 903b which are magnetized (−1)*Brem, which is the opposite of the magnetization of the body of magnet 902, which is (+1)*Brem. The magnetizations of both the body of magnet 902 and portions 903a and 903b can be reversed in embodiments. Sensor 905 is also depicted and is spaced apart from magnet 902 by about 1.5 mm in an embodiment.

The embodiment of FIG. 9 is but one example. Further examples are depicted in cross-section in FIG. 10A-10F. In each example embodiment, a magnet 1002 is depicted comprising an N-pole portion and two S-pole portions, though the N and S designations can be reversed for the respective portions in embodiments. Magnet 1002 is magnetized in the axial (z) direction in embodiments, and while a top or plan view is depicted in each in FIGS. 10A-10F, the magnetizations depicted generally are reversed at the bottom or opposite z-end of magnet 1002. Additionally, the S-pole portions can also be unmagnetized in embodiments. Magnet 1002 also may be rotated (e.g., 90 degrees in either direction) in embodiments with respect to the orientation depicted in FIGS. 10A-10F.

Figure 11A:
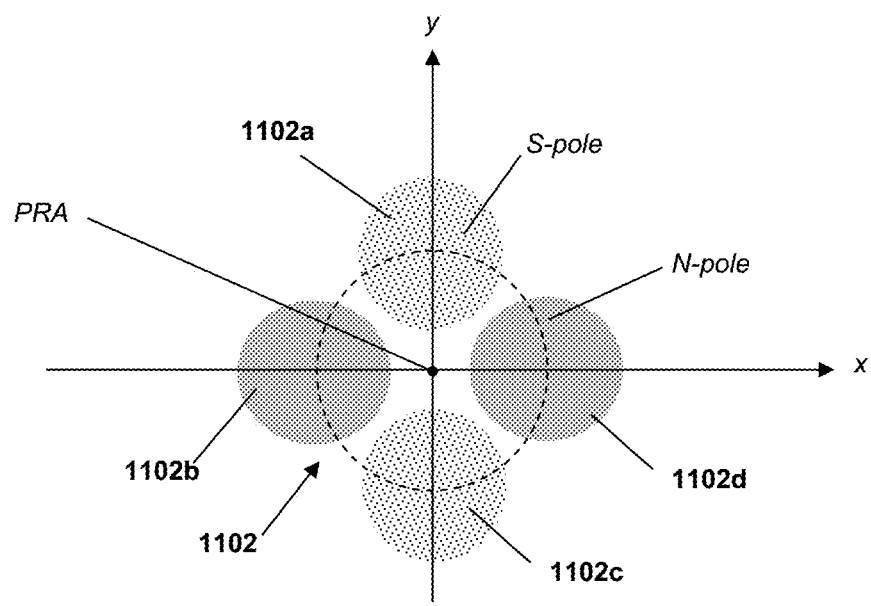
FIG. 11A is a plan view of a magnet according to an embodiment.
Figure 11B:
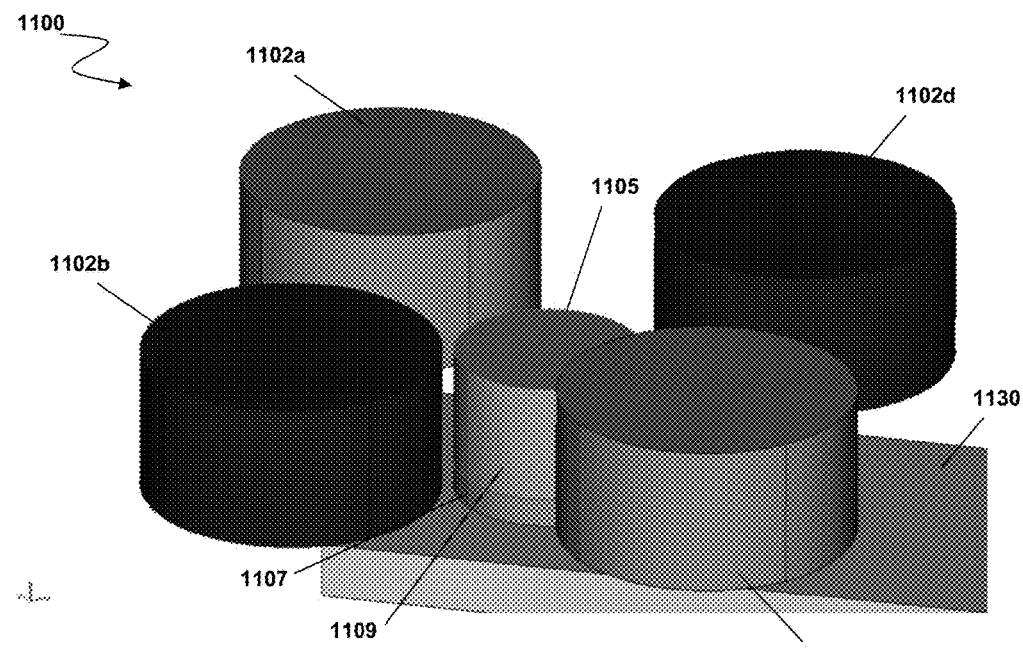
FIG. 11B is a perspective view of a sensor and the magnet of FIG. 11A.

Still another example embodiment is depicted in FIG. 11A, which magnet 1102 comprises four cylinders 1102a, 1102b, 1102c, 1102d. Cylinders 1102a, 1102b, 1102c, 1102d can be decoupled as pictured in FIG. 11A, or coupled with one another or in pairs in other embodiments. Two cylinders 1102a and 1102c have the same magnetization polarity, and the other two cylinders 1102b and 1102d have the same polarity which is the opposite of cylinders 1102a and 1102c. The S and N designations in FIG. 11A can be reversed in other embodiments.

For cylinder 1102d:

$$\frac{\partial B_{y''}}{\partial x} + \frac{\partial B_{x''}}{\partial y} = \left(f'(\varepsilon_R) - \frac{f(\varepsilon_R)}{\varepsilon_R}\right)\sin 2\varphi$$

$$\frac{\partial B_{x''}}{\partial x} - \frac{\partial B_{y''}}{\partial y} = \left(f'(\varepsilon_R) - \frac{f(\varepsilon_R)}{\varepsilon_R}\right)\cos 2\varphi$$

For cylinder 1102b, $\varphi$ can simply be replaced in the above equations by $\varphi$+180. For cylinder 1102a, $\varphi$ is replaced by $\varphi$−90, and the fields are multiplied by (−1):

$$\frac{\partial B_{y''}}{\partial x} + \frac{\partial B_{x''}}{\partial y} =$$

$$-\left(f'(\varepsilon_R) - \frac{f(\varepsilon_R)}{\varepsilon_R}\right)\sin 2(\varphi + 90) \rightarrow \left(f'(\varepsilon_R) - \frac{f(\varepsilon_R)}{\varepsilon_R}\right)\sin 2\varphi$$

$$\frac{\partial B_{x''}}{\partial x} - \frac{\partial B_{y''}}{\partial y} = \left(f'(\varepsilon_R) - \frac{f(\varepsilon_R)}{\varepsilon_R}\right)\cos 2\varphi$$

Cylinder 1102*c* provides the same magnetic field gradients as cylinder 1102*a*. Thus, complete signals for the embodiment of FIG. 11A can be:

$$\frac{\partial B_{y''}}{\partial x} + \frac{\partial B_{x''}}{\partial y} = 4\left(f'(\varepsilon_R) - \frac{f(\varepsilon_R)}{\varepsilon_R}\right)\sin 2\varphi$$

$$\frac{\partial B_{x''}}{\partial x} - \frac{\partial B_{y''}}{\partial y} = 4\left(f'(\varepsilon_R) - \frac{f(\varepsilon_R)}{\varepsilon_R}\right)\cos 2\varphi$$

In other words, the field gradients are four times larger for the embodiment of FIG. 11A than for a single magnet.

Figure 11C:
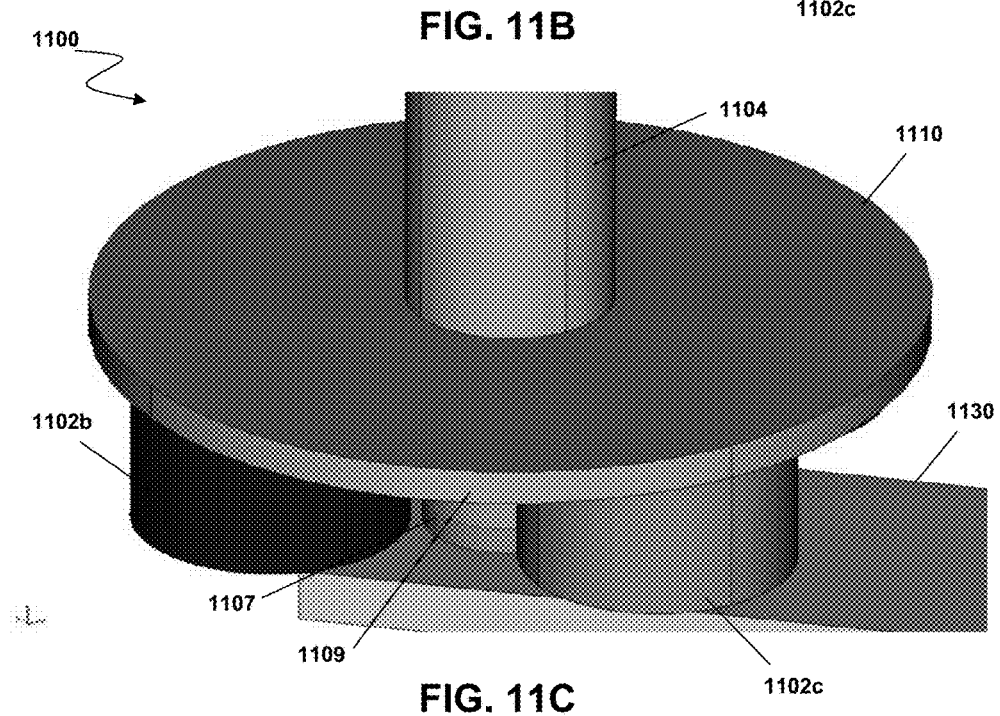
FIG. 11C is a perspective view of the sensor and magnet of FIG. 11B.
Figure 11D:
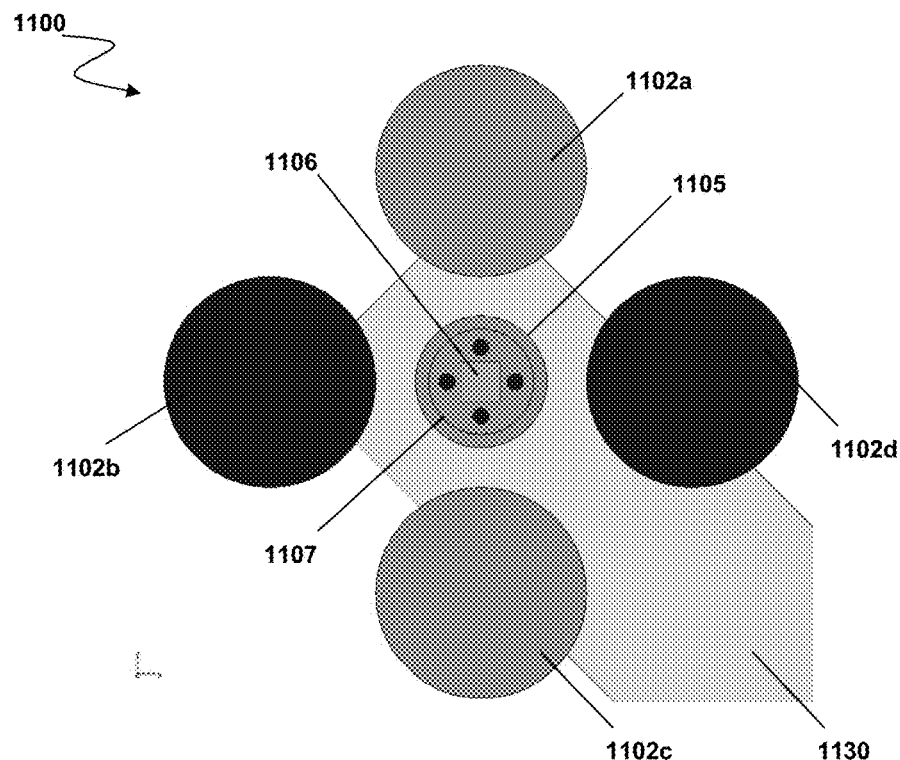
FIG. 11D is a plan view of the sensor and magnet of FIG. 11B.
Figure 11E:
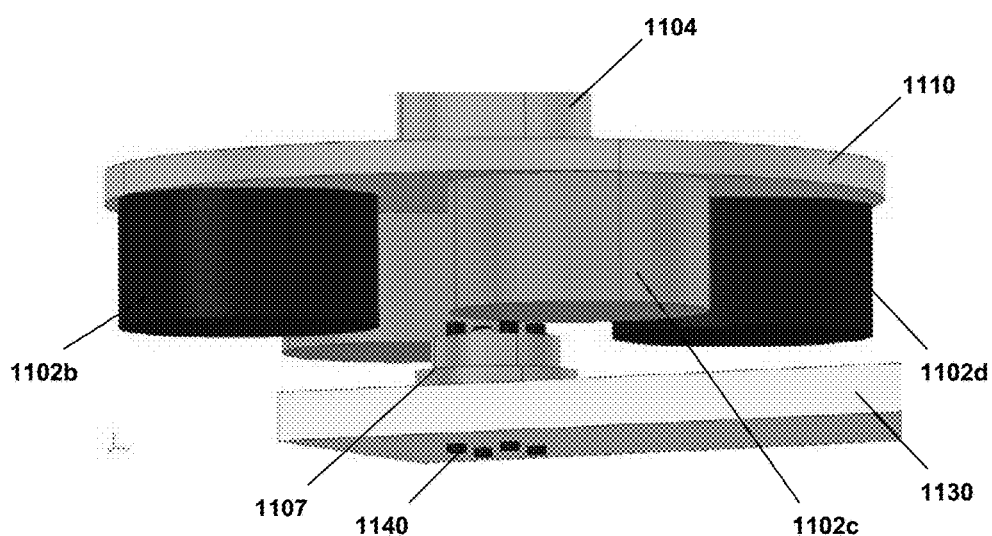
FIG. 11E is a perspective view of the sensor and magnet of FIG. 11B.
Figure 11F:
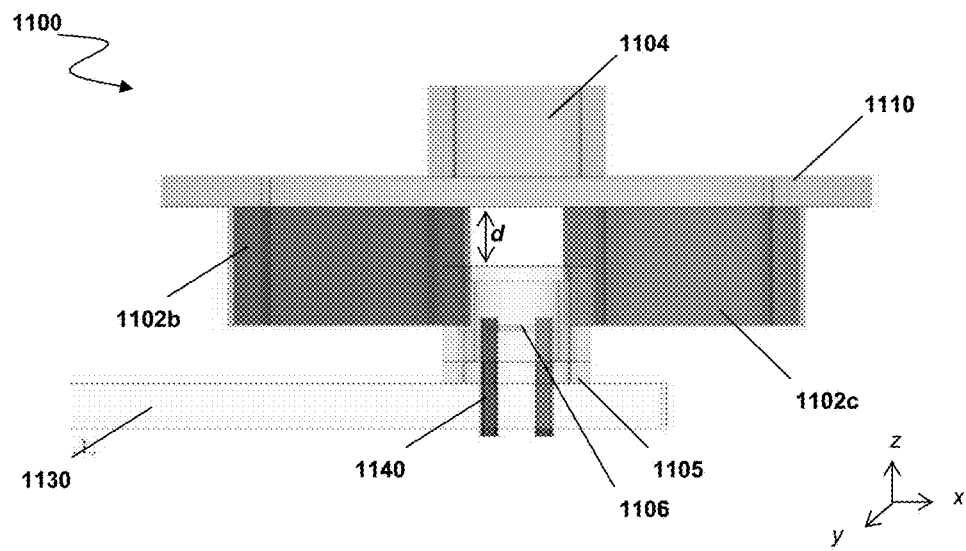
FIG. 11F is a side cross-sectional view of the sensor and magnet of FIG. 11B.

Magnet 1102 is shown with a sensor 1105, which comprises base 1107 and cap 1109 portions of the sensor package, as part of sensor system 1100 in FIGS. 11B, 11C, 11D, 11E and 11F. FIG. 11C includes shaft 1104 and plate 1110, which are omitted from FIG. 11B. Cylinders 1102*a*, 1102*b*, 1102*c*, 1102*d* are spaced apart from sensor 1105 by about 1 mm as depicted, wherein sensor 1105 has a diameter of about 6 mm. FIG. 11D omits cap 1109 such that die 1106 can be seen, and in FIGS. 11D and 11E four leads 1140 are shown which extend vertically through base 1107 and corresponding holes in component board 1130. In an embodiment, leads 1140 are about 700 μm thick. At the underside of board 1130, visible in FIG. 11E, leads can be soldered or otherwise coupled to copper traces to hold sensor 1105 in place and provide electrical contact. In FIG. 11F, the relative z-positions of die 1106 and cylinders 1102 can be seen and are generally equal. A distance d between the top of cap 1109 and plate 1110 is also visible in FIG. 11F and is about 2 mm in an embodiment.

Figure 12A:
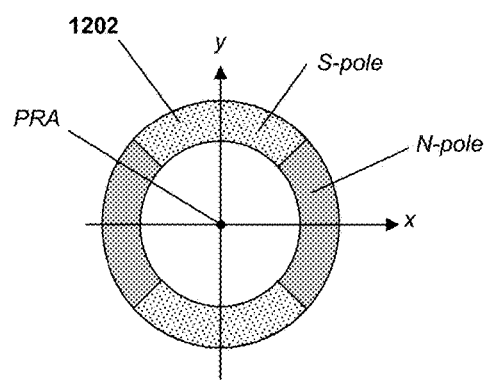
FIG. 12A is a plan view of a magnet according to an embodiment.
Figure 12B:
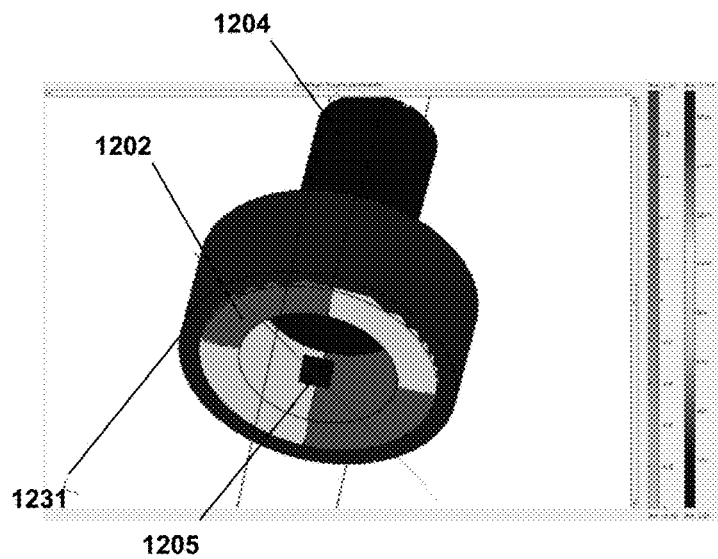
FIG. 12B is a perspective view of the magnet of FIG. 12B.

Yet another embodiment is depicted in FIGS. 12A-B. In FIG. 12A, magnet 1202 is an axially magnetized multi-polar ring magnet comprising alternating sections of N- and S-poles, which can be reversed from the particular orientations shown in FIG. 12A. Magnet 1202 as it can be coupled to shaft 1204 is depicted in FIG. 12B and can comprise an outer sleeve 1231. If magnet 1202 comprises an outer sleeve, which can comprise a soft magnetic material in embodiments, magnet 1202 can be radially magnetized, rather than axially magnetized, wherein in the S-pole regions magnet 1202 can be magnetized toward the center and the N-pole regions radially outwardly (or vice-versa). Thus, magnet 1202 of FIG. 12A can be axially or radially magnetized, whereas magnet 1202 of FIG. 12B generally will be radially magnetized if sleeve 1231 comprises a ferrous material, or will be radially or axially magnetized in embodiments in which sleeve 1231 is nonmagnetic. In one example, sleeve 1231 comprises iron and has an outer diameter of about 14 mm, while magnet 1202 itself can have an outer diameter of about 12 mm and an inner diameter of about 8 mm.

In one embodiment, magnet 1202 is axially magnetized, though in other embodiments magnet 1202 can be radially or otherwise magnetized. For example, two of the portions of magnet 1202 can be magnetized radially inwardly, while the other two portions can be magnetized radially outwardly. In another example, magnet 1202 can be Halbach magnetized with two or more pole pairs according to the magnetization pattern $\vec{M} = M_s \cos(p\psi)\vec{n}_R - M_s \sin(p\psi)\vec{n}_\psi = \ldots = M_s \cos((p-1)\psi)\vec{n}_x - M_s \sin((p-1)\psi)\vec{n}_y$, wherein $M_s$ is the magnitude of the magnetization vector and p is the number of pole pairs and is an integer and may be negative.

Figure 13:
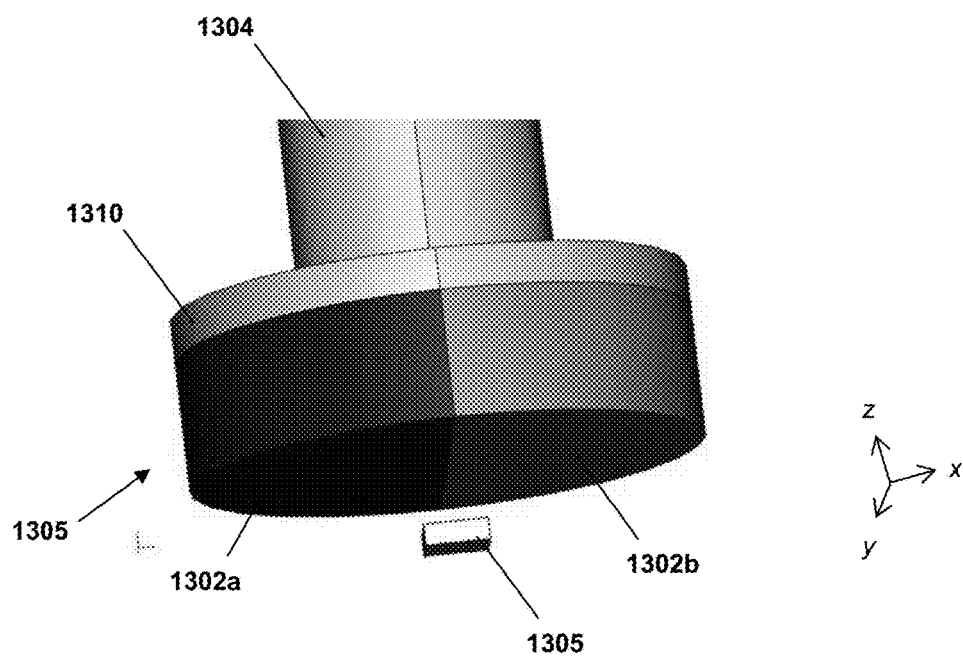
FIG. 13 is a perspective view of a magnet according to an embodiment.

Yet another magnet 1302 is depicted in FIG. 13 and comprises a cylinder-shaped magnet. Magnet 1302 can comprise a multi-polar diametrically magnetized magnet having two halves 1302*a* and 1302*b*. In one embodiment, magnet 1302 is about 3 mm thick and about 12 mm in diameter. Half 1302*a* is magnetized in the +x-direction, and half 1302*b* is magnetized in the −x-direction, with the x-axis being perpendicular to the rotation axis as indicated in FIG. 13.

While magnet 1302 is generally round, it also may be elliptically shaped in other embodiments. It can comprise a single or multiple portions (e.g., like the two portions of magnet 1302), and it can be magnetized along the long or short axis of the ellipse. Still other shapes, portion configurations, magnetization schemes and other characteristics can vary in other embodiments.

Figure 14A:
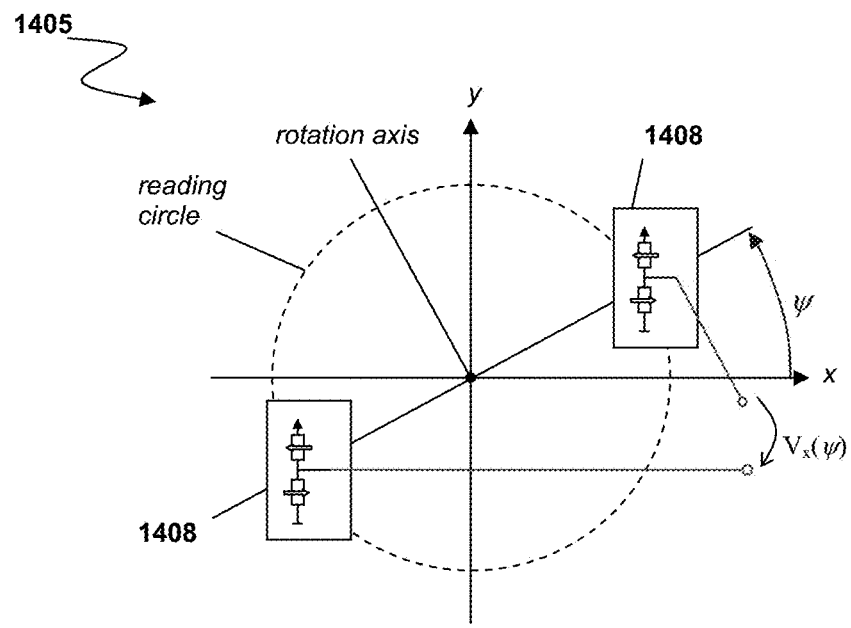
FIG. 14A is a plan view of a sensor according to an embodiment.
Figure 14B:
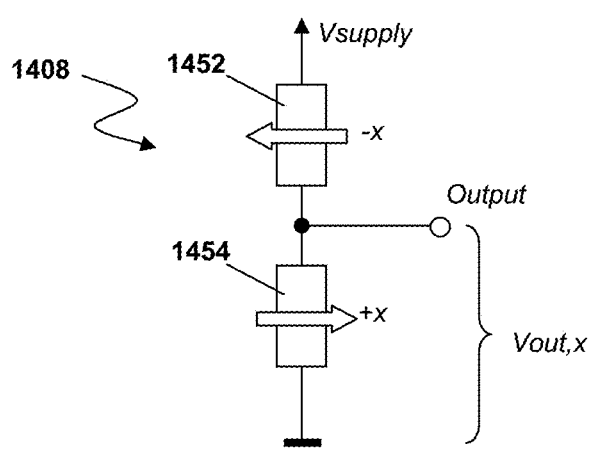
FIG. 14B is a block diagram of a half-bridge circuit according to an embodiment.

In many of the examples given to this point, the sensor has comprised a Hall sensor, such as a vertical Hall sensor, though as mentioned other sensor types can be used. Another suitable sensor type previously mentioned is magnetoresistive, or XMR. In one example embodiment, and referring to FIGS. 12A, 12B, 14A, and 14B, a sensor system comprises magnet 1202 (axially magnetized in this example) and a magnetoresistive sensor 1405. Magnet 1202 can be configured like magnet 202 of FIG. 2, and the center of the cylinder of magnet 1202 so configured can be positioned at $(x, y) = (\epsilon_R \cos \phi, \epsilon_R \sin \phi)$. XMR sensor elements 1408 of sensor 1405 can be arranged on a reading circle centered on the rotation axis and having a diameter 2R. The magnetic field can be developed into a McLaurin series around the center of $(x,y)=(0,0)$:

$$B_x = B_x(0, 0) + \frac{\partial B_x}{\partial x}dx + \frac{\partial B_x}{\partial y}dy$$

and $$B_y = B_y(0, 0) + \frac{\partial B_y}{\partial x}dx + \frac{\partial B_y}{\partial y}dy$$

with dx≈R cos ψ and dy≈R sin ψ, whereby (R,ψ) are radial and azimuthal coordinates of XMR sensor element 1408 (which comprises, e.g., a half-bridge as depicted in FIG. 14B) and $$B_x(0, 0) = -\varepsilon_R \cos\varphi \frac{f}{\varepsilon_R},$$

$$B_y(0, 0) = -\varepsilon_R \sin\varphi \frac{f}{\varepsilon_R}.$$

Then:

$$B_x = -f\cos\varphi + \left(\frac{f}{\varepsilon_R}\sin^2\varphi + f'\cos^2\varphi\right)R\cos\psi + \left(f' - \frac{f}{\varepsilon_R}\right)R\sin\psi\sin\varphi\cos\varphi$$

-continued $$B_y = -f\sin\varphi + \left(\frac{f}{\varepsilon_R}\cos^2\varphi + f'\sin^2\varphi\right)R\sin\psi + \left(f' - \frac{f}{\varepsilon_R}\right)R\cos\psi\sin\varphi\cos\varphi$$

At position (R,ψ), there is a half-bridge 1408 in which resistor 1454 at lower potential has a +x reference direction and resistor 1452 at higher potential has a −x reference direction. Each resistor 1452 and 1454 comprises a magneto-resistor or XMR element. Resistors 1452 and 1454 can comprise GMRs, TMRs, CMRs, or other suitable XMR elements (e.g., generally those comprising a pinned layer, which is a hard magnetic layer defining a magnetic reference direction for the sensor element). In an embodiment in which resistors 1452 and 1454 comprise GMRs, TMRs or CMRs, the output voltage of half-bridge 1408 is $$V_{out,x} = \frac{V_{supply}}{2}\left(1 + h\frac{B_x}{\sqrt{B_x^2 + B_y^2}}\right)$$

with h=0.05 for GMR and 0.5 for TMR. At small R:

$$B_x/\sqrt{B_x^2+B_y^2}=\text{sgn}(f)((R/\varepsilon_R)\sin\varphi\sin(\varphi-\psi)-\cos\varphi)$$

If a second half-bridge 208 is arranged at (R,ψ+180°), the two half-bridges can comprise a diametrical full-bridge, which is depicted in FIG. 14A. The differential output voltage is the difference of output voltages of both half-bridges 208:

$$S_x(\psi) = \frac{V_{out,x}(\psi) - V_{out,x}(\psi+180°)}{hV_{supply}} = \text{sgn}(f)(R/\varepsilon_R)\sin\varphi\sin(\varphi-\psi)$$

This is the same as the gradient of the following quantity, which is referred to as the normalized $B_x$ component:

$$q_x = \frac{B_x}{\sqrt{B_x^2 + B_y^2}}$$

measured at two locations (x, y)=(R cos ψ, R sin ψ) and (x, y)=(R cos(ψ+180°), R sin(ψ+180°)), and subtracted from each other. Analogously, it holds that $$V_{out,y} = \frac{V_{supply}}{2}\left(1 + h\frac{B_y}{\sqrt{B_x^2 + B_y^2}}\right)$$

with $$\lim_{R\to 0} B_y/\sqrt{B_x^2 + B_y^2} = -\text{sgn}(f)((R/\varepsilon_R)\cos\varphi\sin(\varphi-\psi)+\sin\varphi)$$

and thus $$S_y(\psi) = \frac{V_{out,y}(\psi) - V_{out,y}(\psi+180°)}{hV_{supply}}$$
$$= -\text{sgn}(f)(R/\varepsilon_R)\cos\varphi\sin(\varphi-\psi)$$

Figure 14C:
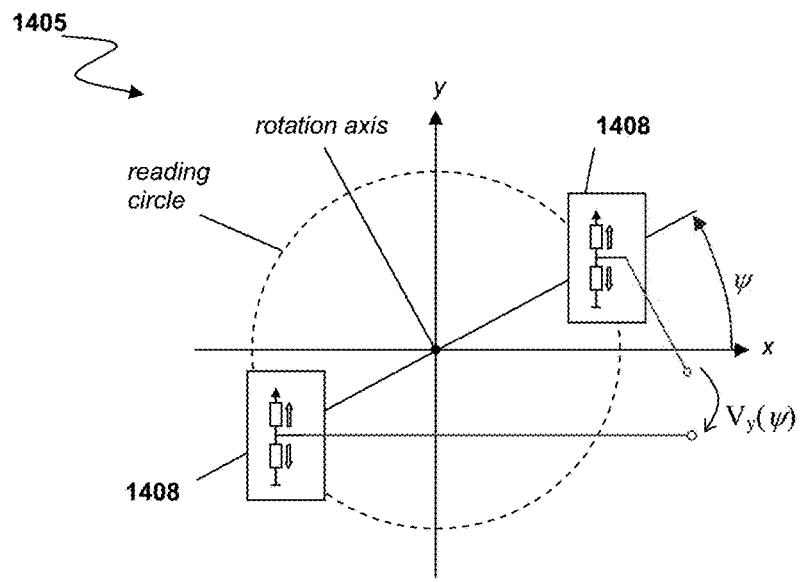
FIG. 14C is a plan view of a sensor according to an embodiment.

Additionally, $S_y$ is proportional to the gradient of $$q_y = \frac{B_y}{\sqrt{B_x^2 + B_y^2}}$$

measured at the two locations (x, y)=(R cos ψ, R sin ψ) and (x, y)=(R cos(ψ+180°), R sin(ψ+180°)), and subtracted from each other, as depicted in FIG. 14C and in which the reference directions of resistors 1452 and 1454 are altered from those of FIG. 14A as indicated. Thus, the embodiments of FIGS. 3 and 4 detect the gradients of the magnetic field components $B_x$ and $B_y$ along x- and y-directions, whereas the embodiments of FIGS. 14A and C detect the gradients of the normalized field components $q_x$ and $q_y$ along the arbitrary ψ-direction. In either case, the detected gradients are valid at PRA, which is a projection of the rotation axis and therefore "on" the axis.

Thus, in an embodiment, two diametrical full-bridges are arranged at the same locations, one full-bridge having +/−x reference direction, and the other having +/−y reference direction. The ratio between them is equal to the tangent of the rotation angle of the magnet:

$$\tan\phi = S_x(\psi)/S_y(\psi)$$

which provides $$\phi = \arctan(S_x(\psi)/S_y(\psi))$$

though this only works if φ≠ψ, because for φ=ψ both signals vanish $S_x(\psi)=S_y(\psi)=0$.

Figure 14D:
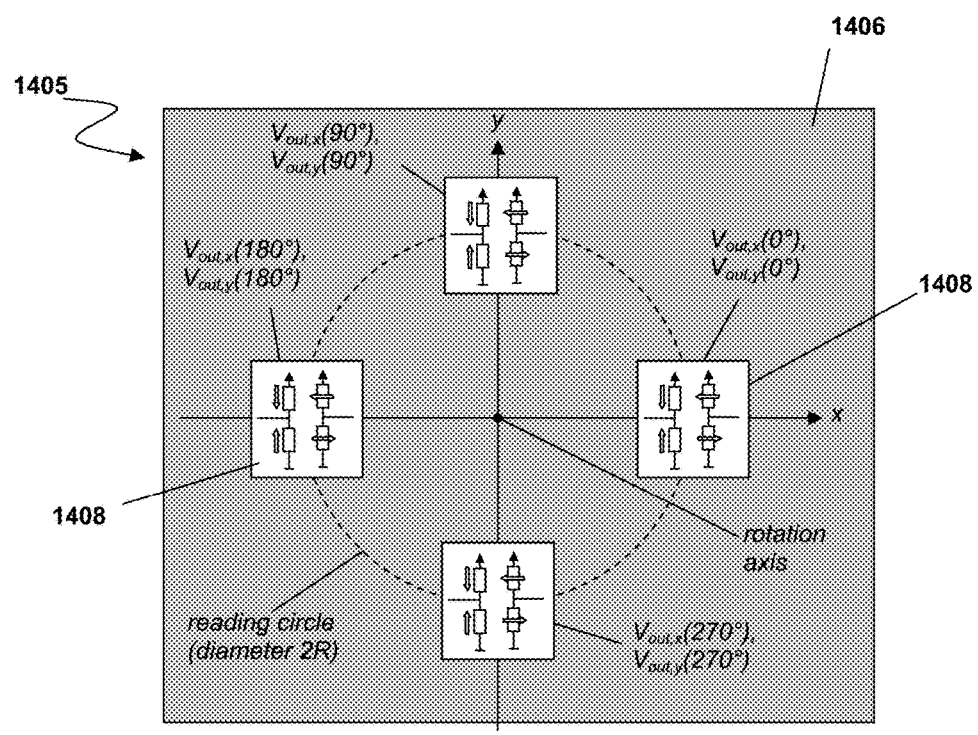
FIG. 14D plan view of a sensor according to an embodiment.

In another embodiment, then, and referring to FIG. 14D, four diametrical full-bridges are arranged on die 1406 as depicted and provide:

$$S_x(\psi), S_y(\psi), S_x(\psi+90°), S_y(\psi+90°)$$

whereby $$S_y(\psi+90°)=-\text{sgn}(f)(R/\varepsilon_R)\sin\varphi\cos(\varphi-\psi)$$

and $$S_y(\psi+90°)=\text{sgn}(f)(R/\varepsilon_R)\cos\varphi\cos(\varphi-\psi)$$

Then, for ψ=0°:

$$S_x(0°)=\text{sgn}(f)(R/\varepsilon_R)\sin^2\varphi$$

$$S_y(0°)=-\text{sgn}(f)(R/\varepsilon_R)\cos\varphi\sin\varphi$$

$$S_x(90°)=-\text{sgn}(f)(R/\varepsilon_R)\sin\varphi\cos\varphi$$

$$S_y(90°)=\text{sgn}(f)(R/\varepsilon_R)\cos^2\varphi$$

Thus, the signals can be constructed:

$$S_y(90°)-S_x(0°)=\text{sgn}(f)(R/\varepsilon_R)\cos(2\varphi)$$

$$-S_y(0°)-S_x(90°)=\text{sgn}(f)(R/\varepsilon_R)\sin(2\varphi)$$

From which it follows:

$$\varphi = \frac{1}{2}\arctan2\{\text{sgn}(f)[S_y(90°)-S_x(0°)]; \text{sgn}(f)[-S_y(0°)-S_x(90°)]\}$$

Thus, sensor 1405 measures the signals of the four diametrical full bridges, adds and subtracts them according to the above formula, determines the arctangent, and then divides the result by two. This can be interpreted with a hypothetical pointer in the complex plane, whose real part is equal to $S_y(90°)-S_x(0°)$ and whose imaginary part is equal to $-S_y(0°)-S_x(90°)$, whereby the angle between the pointer and the positive real axis of the complex plane is 2φ. In general terms, the sensor system determines half of the angle between the pointer and the positive real axis (either by an arctan-operation or by numerous other known ways).

Figure 15:
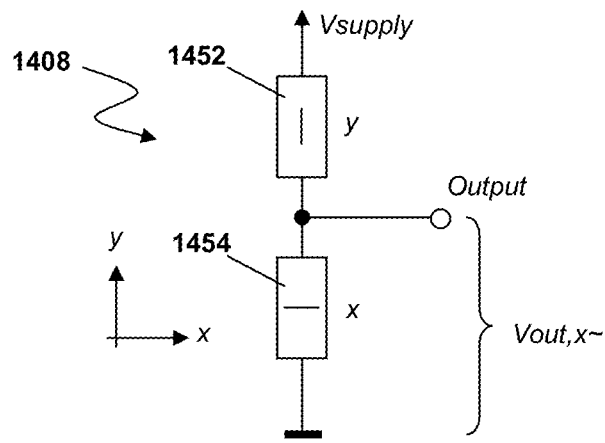
FIG. 15 is a block diagram of a half-bridge circuit according to an embodiment.

Instead of magneto-resistors with a pinned layer (e.g., GMR, TMR, CMR), a system may also use anisotropic magneto-resistors (AMR), which have no pinned layer and in which the magnetic reference direction is defined by the direction of current flow through the AMR, which is often done with Barber poles. Such an AMR resistor has a resistance according to $Rref*(1+h*\cos^2(\alpha))$, where $\alpha$ is the angle between the in-plane projection of the magnetic field and the reference direction. If a half-bridge circuit 1408 as depicted in FIG. 15 comprises AMRs 1452 and 1454, the reference direction of AMR 1454 is parallel to the x-direction, and the reference direction of AMR 1452 is parallel to the y-direction. These directions are denoted by the horizontal and vertical straight line in the resistor symbol in FIG. 15.

The output voltage of such a half-bridge 1408 is given by $$V_{out,\tilde{x}} = \frac{V_{supply}}{2+h}\left(1 + h\frac{B_x^2}{B_x^2 + B_y^2}\right)$$

with h=0.03.

Figure 16:
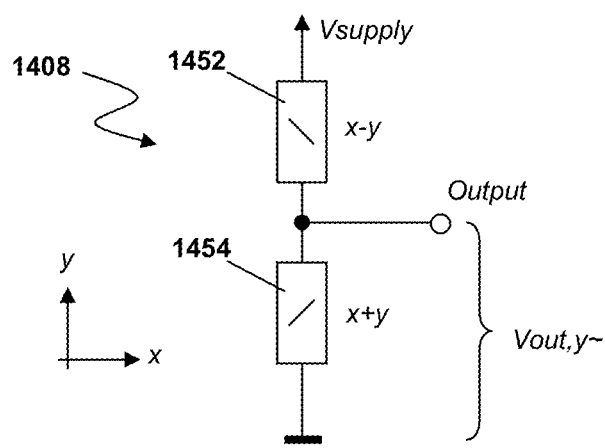
FIG. 16 is a block diagram of a half-bridge circuit according to an embodiment.

A second half bridge circuit shown in FIG. 16 can have AMRs 1452 and 1454 with reference directions rotated by 45° with respect to the reference directions of AMRs 1452 and 1454 in FIG. 15, such that the reference direction of AMR 1454 is parallel to the direction $\vec{n}_x+\vec{n}_y$, while the reference direction of AMR 1452 is parallel to $\vec{n}_x-\vec{n}_y$. Thus, the output of half-bridge 1408 of FIG. 16 is:

$$V_{out,\tilde{y}} = \frac{V_{supply}}{2+h}\left(1 + \frac{h}{2}\frac{(B_x + B_y)^2}{B_x^2 + B_y^2}\right)$$

One or both such half-bridge circuits can be arranged on a circle of radius 2R concentric to the rotation axis and at regular azimuthal positions $\psi^{(m)}=2\pi m/N$ with m=0, 1, 2 . . . (N−1). The system then can determine the discrete Fourier transforms:

$$\sigma_{\tilde{x},n} = (1/N)\sum_{m=0}^{N-1} V_{out,\tilde{x}}(\psi^{(m)})\exp(jn\psi^{(m)})$$

and $$\sigma_{\tilde{y},n} = (1/N)\sum_{m=0}^{N-1} V_{out,\tilde{y}}(\psi^{(m)})\exp(jn\psi^{(m)})$$

Then the system can determine the following, with n=N−1 and for arbitrary N>2:

$$-\text{Re}\{\sigma_{\tilde{y},N-1}\} - \text{Im}\{\sigma_{\tilde{x},N-1}\} = \frac{V_{supply}}{2+h}\frac{hR}{2\varepsilon_R}\sin\varphi$$

and $$-\text{Re}\{\sigma_{\tilde{x},N-1}\} + \text{Im}\{\sigma_{\tilde{y},N-1}\} = \frac{V_{supply}}{2+h}\frac{hR}{2\varepsilon_R}\cos\varphi$$

In other words, the term $$-\sigma_{\tilde{x},N-1} - j\sigma_{\tilde{y},N-1} = \frac{V_{supply}}{2+h}\frac{hR}{2\varepsilon_R}\exp(j\varphi)$$

is a complex pointer, and the rotation angle of the magnet is the angle between this pointer and the positive real axis of the complex plane.

The system can also determine, with n=1 and for arbitrary N>2:

$$\text{Re}\{\sigma_{\tilde{y},1}\} + \text{Im}\{\sigma_{\tilde{x},1}\} = \frac{V_{supply}}{2+h}\frac{hR}{2\varepsilon_R}\sin(3\varphi)$$

and $$\text{Re}\{\sigma_{\tilde{x},1}\} - \text{Im}\{\sigma_{\tilde{y},1}\} = \frac{V_{supply}}{2+h}\frac{hR}{2\varepsilon_R}\cos(3\varphi)$$

In other words, the term $$\sigma_{\tilde{x},1} + j\sigma_{\tilde{y},1} = \frac{V_{supply}}{2+h}\frac{hR}{2\varepsilon_R}\exp(3j\varphi)$$

is a complex pointer and the rotation angle of the magnet is a third of the angle between this pointer and the positive real axis.

Figure 17:
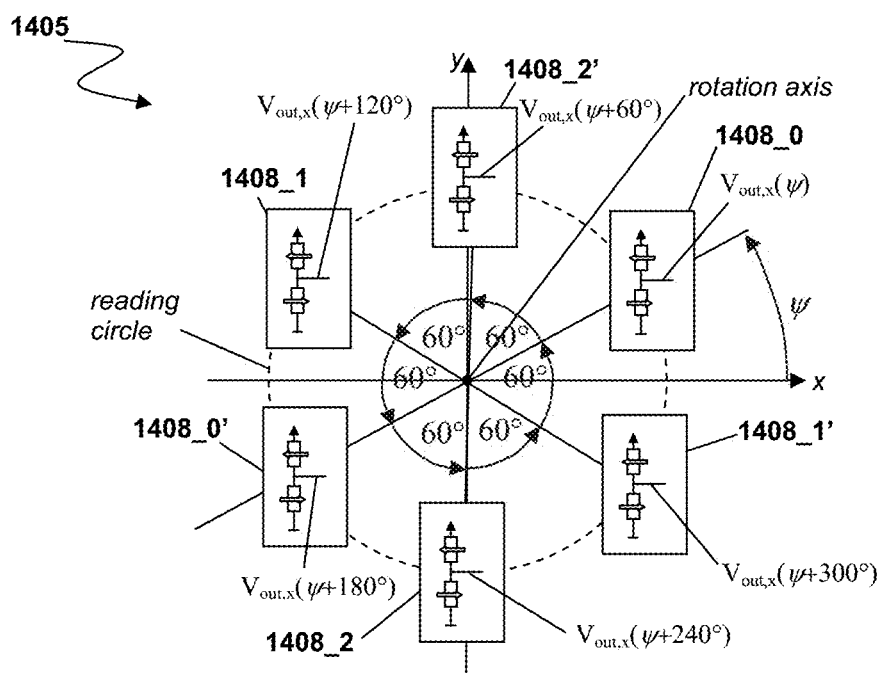
FIG. 17 is a plan view of a sensor according to an embodiment.

Still another XMR embodiment depicted in FIG. 17 comprises N≥3 diametrical full bridges, each with the same reference direction (e.g., the x-direction) and located at positions $\psi^{(m)}=2\pi m/N$ with m=0, 1, 2 . . . (N−1). The first diametrical full bridge with output signal $S_x(\psi^{(0)})=V_{out,x}(\psi)-V_{out,x}(\psi+180°)$ comprises half bridges 1408_0 and 1408_0', the second full bridge has output signal $S_x(\psi^{(1)})=V_{out,x}(\psi+120°)-V_{out,x}(\psi+300°)$ and comprises 1408_1 and 1408_1', and the third has output signal $S_x(\psi^{(2)})=V_{out,x}(\psi+240°)-V_{out,x}(\psi+60°)$ and comprises 1408_2 and 1408_2'. The signals can be transformed according to a discrete Fourier transform:

$$\sigma_{x,n} = (1/N)\sum_{m=0}^{N-1} S_x(\psi^{(m)})\exp(jn\psi^{(m)})$$

with $$n = 1$$

or $$n = N - 1$$

with $$j = \sqrt{-1}$$

Then, the arctangent of the ratio or real and imaginary parts can be determined to obtain the rotation angle. For $\phi=0°$ or $\phi=180°$ this does not work because all signals $S_x(\psi^{(m)})$ vanish. In this case the sensor system can have this very same arrangement with a y-reference direction instead of x and determine:

$$\sigma_{y,n} = (1/N)\sum_{m=0}^{N-1} S_y(\psi^{(m)})\exp(jn\psi^{(m)})$$

with $n = 1$ or $n = N - 1$

If both reference directions are available there is always one with non-vanishing signals so that it works for all rotational positions.

Alternatively, the system can determine:

$$Re\{\sigma_{y,1}\}+Im\{\sigma_{x,1}\}=-(R/\epsilon_R)\mathrm{sgn}(f(\epsilon_R))\sin 2\phi$$

$$Re\{\sigma_{x,1}\}-Im\{\sigma_{y,1}\}=-(R/\epsilon_R)\mathrm{sgn}(f(\epsilon_R))\cos 2\phi$$

with n=1 or n=N−1. These two equations represent the real and imaginary parts of a pointer in the complex plane: this pointer is equal to $\sigma_{x,1}+j\sigma_{y,1}=(-R/\epsilon_R)\mathrm{sgn}(f(\epsilon_R))\exp(2j\phi)$, and the angle between this pointer and the positive real axis is $2\phi$, which is twice the rotational position of the magnet.

Figure 18:
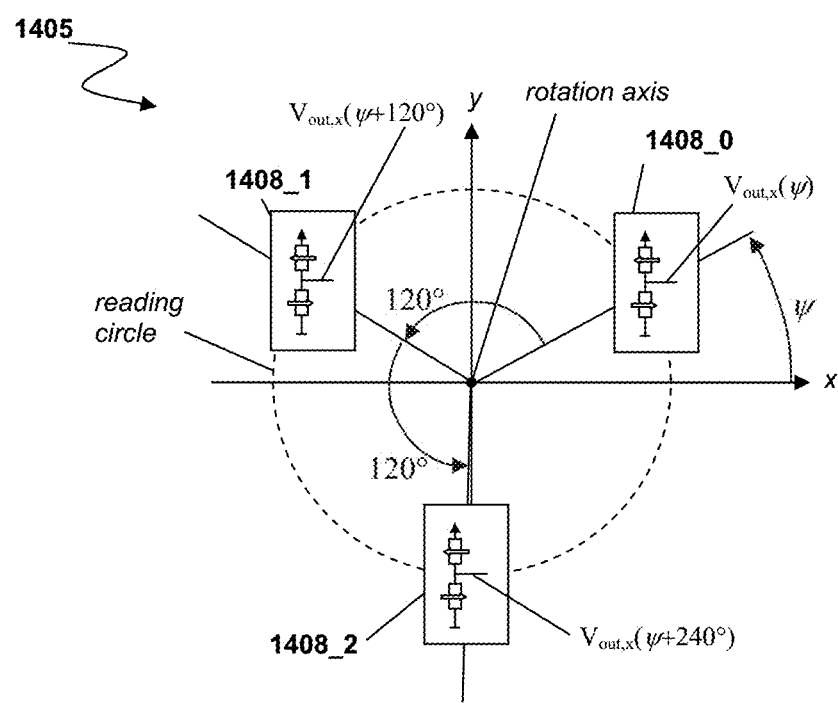
FIG. 18 is a plan view of a sensor according to an embodiment.

Instead of using full diametrical bridges as in FIG. 17 it is also possible to use only half-bridges as in FIG. 18, because the common mode voltage cancels out for n=1 and n=N−1 in the discrete Fourier transform. Even in this case the complex pointer is a linear superposition of gradients sampled on the rotation axis, as is shown next. With $$B_x(R,\psi)=B_x(0,0)+\partial B_x(0,\psi)/\partial R \times R + O(R^2) \text{ and } B_y(R,\psi)=B_y(0,0)+\partial B_y(0,\psi)/\partial R \times R + O(R^2)$$

inserted into $$V_{out,x}=0.5 \times V_{supply}(1+hB_x(R,\psi)/\sqrt{B_x^2(R,\psi)+B_y^2(R,\psi)})$$

and $$V_{out,y}=0.5 \times V_{supply}(1+hB_y(R,\psi)/\sqrt{B_x^2(R,\psi)+B_y^2(R,\psi)})$$

it follows that $$\sigma_{x,1} + j\sigma_{y,1} =$$

$$\frac{V_{supply}}{2}\frac{hR}{N(B_x^2(0,0)+B_y^2(0,0))^{3/2}}\left\{B_y^2(0,0)\sum_{m=0}^{N-1}\frac{\partial B_x(0,\psi^{(m)})}{\partial R}\exp(j\psi^{(m)})-\right.$$

$$B_x(0,0)B_y(0,0)\sum_{m=0}^{N-1}\frac{\partial B_y(0,\psi^{(m)})}{\partial R}\exp(j\psi^{(m)})+$$

$$jB_x^2(0,0)\sum_{m=0}^{N-1}\frac{\partial B_y(0,\psi^{(m)})}{\partial R}\exp(j\psi^{(m)})-$$

$$\left.jB_x(0,0)B_y(0,0)\sum_{m=0}^{N-1}\frac{\partial B_y(0,\psi^{(m)})}{\partial R}\exp(j\psi^{(m)})\right\}$$

At the left-hand side of this equation there is the complex pointer from which the rotational angle $\phi$ is derived, and at the right hand side there is a linear combination of gradients $\partial B_x(R,\psi)/\partial R$ and $\partial B_y(R,\psi)/\partial R$ sampled on the rotation axis R=0.

Figure 19:
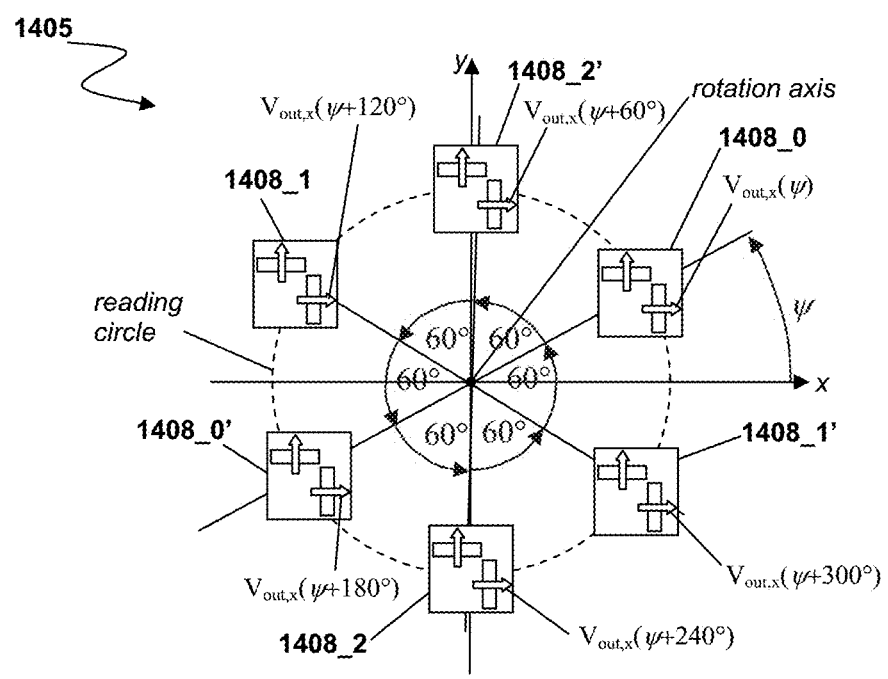
FIG. 19 is a plan view of a sensor according to an embodiment.

Instead of the layouts shown in, e.g., FIGS. 17 and 18, it is also possible to arrange a plurality of N≥3 Bx or By sensor elements in a regular azimuthal grid of spacing 360/N on a reading circle with a diameter 2R (concentric to the rotation axis as in other embodiments), perform a Fourier transformation and derive the rotation angle. This is shown in FIG. 19 for N=3 but can be generalized for arbitrary N as proven mathematically here:

$$B_x=(x-\epsilon_R \cos\phi)f(\sqrt{(x-\epsilon_R\cos\phi)^2+(y-\epsilon_R\sin\phi)^2})/\sqrt{(x-\epsilon_R\cos\phi)^2+(y-\epsilon_R\sin\phi)^2}$$

and $$B_y=(y-\epsilon_R \sin\phi)f(\sqrt{(x-\epsilon_R\cos\phi)^2+(y-\epsilon_R\sin\phi)^2})/\sqrt{(x-\epsilon_R\cos\phi)^2+(y-\epsilon_R\sin\phi)^2}$$

with x=R*cos(psi) and y=R*sin(psi). Then, Bx(R,psi)−Bx(R,psi+180°) and By(R,psi)−By(R,psi+180°) can be determined and expanded into a McLaurin series up to first order in R:

$$B_x(\psi) - B_x(\psi + 180°) =$$
$$2\frac{R}{\epsilon_R}f(\epsilon_R)\sin\varphi\sin(\varphi-\psi)+2Rf'(\epsilon_R)\cos\varphi\cos(\varphi-\psi)$$

$$B_y(\psi) - B_y(\psi + 180°) =$$
$$-2\frac{R}{\epsilon_R}f(\epsilon_R)\cos\varphi\sin(\varphi-\psi)+2Rf'(\epsilon_R)\sin\varphi\cos(\varphi-\psi)$$

The fundamental frequency of a continuous Fourier transform (which is valid for large N) is:

$$\sigma_{x,1} = \frac{\epsilon_R}{2\pi R}\int_{\psi=0}^{2\pi}[B_x(\psi)-B_x(\psi+180°)]\exp(j\psi)d\psi =$$
$$f(\epsilon_R)\sin^2\varphi + \epsilon_R f'(\epsilon_R)\cos^2\varphi + j\{\epsilon_R f'(\epsilon_R) - f(\epsilon_R)\}\sin\varphi\cos\varphi$$

$$\sigma_{y,1} = \frac{\epsilon_R}{2\pi R}\int_{\psi=0}^{2\pi}[B_y(\psi)-B_y(\psi+180°)]\exp(j\psi)d\psi =$$
$$\{\epsilon_R f'(\epsilon_R) - f(\epsilon_R)\}\sin\varphi\cos\varphi + j(f(\epsilon_R)\cos^2\varphi + \epsilon_R f'(\epsilon_R)\sin^2\varphi)$$

from which the following is obtained:

$$Re\{\sigma_{y,1}\}+Im\{\sigma_{x,1}\}=\{\epsilon_R f'(\epsilon_R)-f(\epsilon_R)\}\sin 2\phi$$

$$Re\{\sigma_{x,1}\}-Im\{\sigma_{y,1}\}=\{\epsilon_R f'(\epsilon_R)-f(\epsilon_R)\}\cos 2\phi$$

Comparison of these last two equations with the equations discussed above with respect to FIG. 1A shows that these two systems are equivalent:

$$\frac{\partial B_y}{\partial x}+\frac{\partial B_x}{\partial y} = (Re\{\sigma_{y,1}\}+Im\{\sigma_{x,1}\})/\epsilon_R$$

$$\frac{\partial B_x}{\partial x}-\frac{\partial B_y}{\partial y} = (Re\{\sigma_{x,1}\}-Im\{\sigma_{y,1}\})/\epsilon_R$$

The continuous Fourier transformation can be carried out by the system in an embodiment by placing sensor elements on a regular grid on the reading circle with diameter 2*R and determining a linear combination of their signals according to a discrete Fourier transformation:

$$\frac{1}{2\pi}\int_{\psi=0}^{2\pi}[B_x(\psi)-B_x(\psi+180°)]\exp(j\psi)d\psi \cong$$

-continued $$\frac{1}{N}\sum_{m=0}^{N-1}[B_x(\psi^{(\phi)}) - B_x(\psi^{(m)} + 180°)]\exp(j\psi^{(m)})$$

with $\psi^{(m)}=2\pi m/N$ for m=0, 1, 2, . . . , N−1. Introducing $B_x$-fields from above proves that continuous and discrete Fourier transforms give exactly equal results. In FIG. 19, $B_x$- and $B_y$-sensor elements are arranged in pairs (denoted by a rectangle around them). Alternatively, only the $B_x$-sensor elements could be placed at azimuthal positions $\psi^{(m)}=2\pi m/N$, whereas the $B_y$-sensor elements could be placed at azimuthal positions $\psi^{(m)}=2\pi m/N+\Delta\psi$, where $\Delta\psi$ is some arbitrary angle which e.g. can be set to a convenient value such that $B_x$- and $B_y$-sensors do not overlap in the layout.

In embodiments, all sensor elements are arranged on the same die so that the relative positions between them are very accurate (e.g., on the order of micro-meters). Like with XMR-sensors where it is possible to use full diametrical bridges or only half-bridges, the same applies here: it is also possible to merely take $B_x(\psi)$ instead of $B_x(\psi)-B_x(\psi+180°)$ and $B_y(\psi)$ instead of $B_y(\psi)-B_y(\psi)+180°$, which does not change the fundamental frequency of the Fourier transform.

Figure 20:
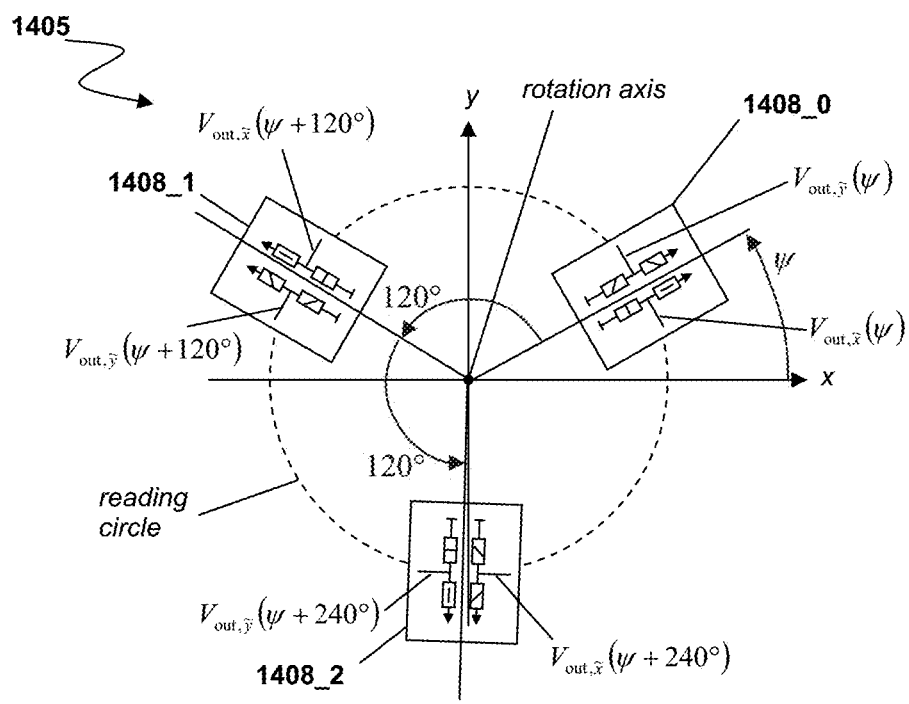
FIG. 20 is a plan view of a sensor according to an embodiment.

To this point, embodiments discussed have generally comprised sensor arrangements in which the reference directions are the same at all azimuthal positions of the sensor elements. It is also possible, however, to rotate the reference directions at the various sensor element positions, one example of which is depicted in FIG. 20. System 1405 comprises sensor elements 1408_0, 1408_1 and 1408_2 that comprise AMR elements, though in other embodiments GMRs, TMRs or vertical Hall devices could be used as the same principles apply. Sensor elements 1408_0, 1408_1 and 1408_2 are arranged in three pairs of orthogonal half-bridge circuits at azimuthal spacings of 120 degrees.

With $Rref*(1+h*\cos^2(alfa))$, $\cos\alpha=B_R/\sqrt{B_R^2+B_\psi^2}$ results for the resistance at higher potential in the $\tilde{x}$ half-bridge circuit and $\cos\alpha=B_\psi/\sqrt{B_R^2+B_\psi^2}$ for the resistance at lower potential in the $\tilde{x}$ half-bridge circuit. Analogously, $\cos\alpha=0.5\times(B_R+B_\psi)/\sqrt{B_R^2+B_\psi^2}$ is for the resistance at higher potential in the $\tilde{y}$ half-bridge circuit and $\cos\alpha=0.5\times(B_R-B_\psi)/\sqrt{B_R^2+B_\psi^2}$ for the resistance at lower potential in the $\tilde{y}$ half-bridge circuit. System 1408 determines the discrete Fourier transforms:

$$\sigma_{\tilde{x},n} = (1/N)\sum_{m=0}^{N-1} V_{out,\tilde{x}}(\psi^{(m)})\exp(jn\psi^{(m)})$$

and $$\sigma_{\tilde{y},n} = (1/N)\sum_{m=0}^{N-1} V_{out,\tilde{y}}(\psi^{(m)})\exp(jn\psi^{(m)})$$

Then system 1408 constructs a complex pointer as a linear combination of the two discrete Fourier transforms. As in other embodiments, there are numerous possibilities; e.g., for N=3 and n=1, the following is obtained:

$$-\sigma_{\tilde{x},n}-j\sigma_{\tilde{y},n}=(0.5/\epsilon_R)(hRV_{supply}/(2+h))\exp(j\phi)$$

Therefore, the argument of the complex pointer $-\sigma_{\tilde{x},1}-j\sigma_{\tilde{y},1}$ is equal to the rotational position of the magnet. Alternatively, system 1408 can construct the pointer:

$$(\sigma_{\tilde{x},1}-j\sigma_{\tilde{y},1})^*=0.5\times(hV_{supply}/(2+h))\exp(2j\phi)$$

where z* denotes the conjugate of z. Therefore, the argument of the complex pointer $(\sigma_{\tilde{x},1}-j\sigma_{\tilde{y},1})^*$ is twice the rotation angle of the magnet.

In general, embodiments discussed herein relate to angle sensor systems that comprise a plurality of magnetic field-sensitive elements that respond to components of the magnetic field perpendicular to the rotation axis. The magnetic field-sensitive elements are arranged proximate the rotation axis so that they can be used to measure the gradients of the magnetic field on the rotation axis. In embodiments, the magnetic field-sensitive elements can be arranged in a plane generally perpendicular to the rotation axis and on a circle concentric to the rotation axis at regular azimuthal spacing 360°/N with N>2. Linear combinations of measured gradients can be determined and interpreted as complex pointers. The coefficients of the linear combinations depend on the locations $\psi^{(m)}=2\pi m/N$ of the respective field sensitive elements used to derive the gradients. These coefficients comprise terms $\exp(jn\psi^{(m)})$ or $\cos(n\psi^{(m)})$ or $\sin(n\psi^{(m)})$ with integer n, such as n=1 or n=N−1. The magnitudes of the coefficients are identical. The systems use either one complex valued linear combination or a mathematically equivalent set of two real-valued linear combinations. The rotational position of the magnetic field source is linearly proportional to the argument of the complex pointer, which means that if the pointer can be represented by $z=|z|\exp(j\zeta)$, with $|z|$ being a non-negative real number and $\zeta$ being a real number, then the argument of the pointer is $\zeta$ and the rotation angle is $\phi=c\zeta$, whereby c is a real number.

Various embodiments of systems, devices and methods have been described herein. These embodiments are given only by way of example and are not intended to limit the scope of the invention. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the invention.

Persons of ordinary skill in the relevant arts will recognize that the invention may comprise fewer features than illustrated in any individual embodiment described above. The embodiments described herein are not meant to be an exhaustive presentation of the ways in which the various features of the invention may be combined. Accordingly, the embodiments are not mutually exclusive combinations of features; rather, the invention can comprise a combination of different individual features selected from different individual embodiments, as understood by persons of ordinary skill in the art. Moreover, elements described with respect to one embodiment can be implemented in other embodiments even when not described in such embodiments unless otherwise noted. Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended. Furthermore, it is intended also to include features of a claim in any other independent claim even if this claim is not directly made dependent to the independent claim.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims for the present invention, it is expressly intended that the provisions of Section 112, sixth paragraph of 35 U.S.C. are not to be invoked unless the specific terms "means for" or "step for" are recited in a claim.

What is claimed is:

1. A magnetic field angle sensor configured to determine a rotational position of a magnetic field source with respect to a rotation axis, comprising:
   a die comprising a first surface and arranged in-line with the rotation axis such that a projection of the rotation axis extends through the die perpendicularly to the first surface;
   at least three magnetic field sensor elements arranged on the first surface of the die around the projection of the rotation axis, the at least three magnetic field sensor elements configured to sense at least two gradients of a magnetic field induced by the magnetic field source, the at least three magnetic field sensor elements being sensitive to magnetic field components perpendicular to the rotation axis and parallel with the first surface; and
   circuitry configured to determine the rotational position of the magnetic field source by determining at least one linear combination of the at least two gradients and deriving the rotational position from the at least one linear combination.

2. The magnetic field angle sensor of claim 1, wherein the at least three magnetic field sensor elements are arranged on the first surface in a circle concentric to the projection of the rotation axis, wherein the circle has a diameter of less than 4 millimeters.

3. The magnetic field angle sensor of claim 2, wherein the at least three magnetic field sensor elements comprise N sensor elements spaced apart in the circle by regular azimuthal spacings of 360 degrees/N.

4. The magnetic field angle sensor of claim 1, wherein the at least two gradients comprise a gradient of a first magnetic field component along a first direction, a gradient of a second magnetic field component along a second direction, the first and second magnetic field components and the first and second directions being different, and at least one of a gradient of the first magnetic field component along the second direction and the second magnetic field component along the first direction.

5. The magnetic field angle sensor of claim 1, wherein the at least one linear combination of the at least two gradients is equal to a sum over terms that are equal to coefficients multiplied by measured gradients, wherein the coefficients are independent of a rotational position of the magnetic field source, and wherein the coefficients have the same magnitude.

6. The magnetic field angle sensor of claim 1, wherein the at least one linear combination of the at least two gradients comprises coefficients multiplied with the at least two gradients, wherein the coefficients are related to azimuthal positions of the at least three magnetic field sensor elements where the at least two gradients are sensed.

7. The magnet field angle sensor of claim 1, wherein the at least one linear combination of the at least two gradients has complex coefficients multiplied with measured gradients, wherein the circuitry is configured to derive the rotational position from an argument of the complex linear combination.

8. The magnetic field angle sensor of claim 7, wherein a k-fold rotational angle is equal to the argument of the complex linear combination, wherein k is an integer number.

9. The magnetic field angle sensor of claim 8, wherein a magnitude of k is 1, 2 or 3.

10. The magnetic field angle sensor of claim 1, wherein the at least three magnetic field sensor elements comprise Hall plates, vertical Hall elements, MAGFETs, anisotropic magnetoresistors, or magnetoresistors comprising at least one pinned layer.

11. The magnetic field angle sensor of claim 1, wherein the at least three magnetic field sensor elements comprise two groups of magnetic field sensor elements, wherein a first of the two groups comprises magnetic field sensor elements sensitive to a first direction of arbitrary polarity and a second of the two groups comprises magnetic field sensor elements sensitive to a second direction of an arbitrary polarity, and wherein the first and second directions are perpendicular to each other and to the rotation axis.

12. The magnetic field angle sensor of claim 1, wherein each of the at least three magnetic field sensor elements comprises two half-bridge circuits, wherein each half-bridge circuit is at a different location and comprises two magnetoresistors.

13. The magnetic field angle sensor of claim 12, wherein the at least three magnetic field sensor elements comprise N 2:3 full-bridge circuits arranged on the first substrate equidistantly spaced from the rotation axis at regular azimuthal spacings of 360 degrees/N.

14. The magnetic field angle sensor of claim 1, wherein the circuitry is configured to determine the rotational position of the magnetic field source from an angle between a pointer in a complex plane and a positive real axis, wherein a real part of the pointer is equivalent to a linear combination of dBy/dx and dBx/dy, and wherein an imaginary part of the pointer is equivalent to a linear combination of dBx/dx and dBy/dy, wherein dBy/dx is a gradient of the magnetic field component in a second direction along a first direction, dBx/dy is a gradient of the magnetic field component in the first direction along the second direction, dBx/dx is a gradient of the magnetic field component in the first direction along the first direction, and dBy/dy is a gradient of the magnetic field component in the second direction along the second direction.

15. The magnetic field angle sensor of claim 1, wherein the magnetic field source comprises a magnet axially magnetized in at least one direction.

16. The magnetic field angle sensor of claim 15, wherein the magnet has a magnetization pattern that is rotationally asymmetric with respect to the rotation axis.

17. The magnetic field angle sensor of claim 15, wherein the magnet has a Halbach-type magnetization pattern.

18. A method of determining a rotational position of a magnetic field source with respect to a rotation axis, comprising:
   providing at least three magnetic field sensor elements arranged on a surface around a projection of the rotation axis onto the surface, the at least three magnetic field sensor elements configured to sense at least two gradients of a magnetic field component of a magnetic field induced by the magnetic field source, the magnetic field component being perpendicular to the rotation axis and parallel with the surface; and providing circuitry coupled to the at least three magnetic field sensor elements to operably determine the rotational position of the magnetic field source by determining at least one linear combination of the at least two gradients and deriving the rotational position from the at least one linear combination.

19. The method of claim 18, wherein providing circuitry further comprise providing circuitry to operably determine the rotational position of the magnetic field source from an angle between a pointer in a complex plane and a positive real axis, wherein a real part of the pointer is equivalent to a linear combination of dBy/dx and dBx/dy, and wherein an imaginary part of the pointer is equivalent to a linear combination of dBx/dx and dBy/dy, wherein dBy/dx is a gradient of the magnetic field component in a second direction along a first direction, dBx/dy is a gradient of the magnetic field component in the first direction along the second direction, dBx/dx is a gradient of the magnetic field component in the first direction along the first direction, and dBy/dy is a gradient of the magnetic field component in the second direction along the second direction.

20. The method of claim 18, wherein providing at least three magnetic field sensor elements comprises providing at least three magnetic field sensor elements that comprise one of Hall plates, vertical Hall elements, MAGFETs, anisotropic magnetoresistors, or magnetoresistors comprising at least one pinned layer.

\* \* \* \* \*